(12) United States Patent
Davis et al.

(10) Patent No.: US 7,149,054 B1
(45) Date of Patent: Dec. 12, 2006

(54) REVERSE FLOW DISK DRIVE AND HEAD SUSPENSION FOR SAME

(75) Inventors: Michael W. Davis, Rockford, MN (US); Wade A. Linnertz, Chanhassen, MN (US); Raymond R. Wolter, Hutchinson, MN (US); Robert B. Evans, Hutchinson, MN (US); Todd A. Krinke, Rockford, MN (US); Yiduo Zhang, Plymouth, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 389 days.

(21) Appl. No.: 10/655,522

(22) Filed: Sep. 4, 2003

Related U.S. Application Data

(62) Division of application No. 09/858,303, filed on May 15, 2001, now abandoned.

(60) Provisional application No. 60/221,758, filed on Jul. 31, 2000, provisional application No. 60/217,789, filed on Jul. 12, 2000, provisional application No. 60/205,344, filed on May 18, 2000.

(51) Int. Cl.
  *G11B 17/02* (2006.01)
  *G11B 5/48* (2006.01)

(52) U.S. Cl. ............................... 360/97.02; 360/244.5

(58) Field of Classification Search ............. 360/97.02, 360/97.03
See application file for complete search history.

(56) References Cited

U.S. PATENT DOCUMENTS

| | | | |
|---|---|---|---|
| 4,821,130 A | 4/1989 | Bernett et al. | |
| 4,879,618 A | 11/1989 | Iida et al. | |
| 5,134,530 A | 7/1992 | Hall | |
| 5,166,845 A | 11/1992 | Thompson et al. | |
| 5,218,496 A | 6/1993 | Kaczeus | |
| 5,471,733 A | 12/1995 | Bernett et al. | |
| 5,557,488 A | 9/1996 | Hamilton et al. | |
| 5,901,016 A | 5/1999 | Iwamoto | |
| 5,912,094 A | 6/1999 | Aksyuk et al. | |

(Continued)

FOREIGN PATENT DOCUMENTS

JP  10-149521  11/2000

(Continued)

OTHER PUBLICATIONS

Suzuki et al., "Flow Past Large Obstructions Between Corotating Disks in Fixed Cylindrical Enclosures", *Journal of Fluids Engineering*, Sep. 1997, vol. 119: 499-505.

(Continued)

*Primary Examiner*—R. S. Tupper
(74) *Attorney, Agent, or Firm*—Faegre & Benson LLP

(57) ABSTRACT

A head suspension for a reverse flow disk drive. The head suspension includes a load beam having a mounting region at a proximal end, a rigid region at a distal end and a spring region between the mounting region and the rigid region. A flexure is mounted on the distal end of the rigid region. A slider is mounted on the flexure. The slider has a proximal end closest to the proximal end of the load beam, wherein the spring region, the rigid region, the flexure and the slider comprise an active portion. One or more read/write heads are located on the proximal end of the slider. A plurality of electrical traces extend along the head suspension to the proximal end of the slider. At least one airflow attenuator is provided that creates a region of reduced airflow velocity proximate at least a portion of the active portion. An actuator assembly and to a reverse flow disk drive are also disclosed.

23 Claims, 25 Drawing Sheets

U.S. PATENT DOCUMENTS

| | | |
|---|---|---|
| 5,920,444 A | 7/1999 | Heeren et al. |
| 5,923,798 A | 7/1999 | Aksyuk et al. |
| 5,936,804 A | 8/1999 | Riener et al. |
| 5,982,584 A | 11/1999 | Bennin et al. |
| 5,994,159 A | 11/1999 | Aksyuk et al. |
| 6,043,956 A | 3/2000 | Hanya et al. |
| 6,046,888 A | 4/2000 | Krinke et al. |
| 6,091,570 A | 7/2000 | Hendriks |
| 6,282,064 B1 | 8/2001 | Palmer et al. |
| 6,498,702 B1 | 12/2002 | Shimizu et al. |
| 6,539,609 B1 | 4/2003 | Palmer et al. |
| 6,972,926 B1 * | 12/2005 | Codilian .................. 360/97.02 |
| 2003/0026038 A1 | 2/2003 | Zeng et al. |
| 2003/0133226 A1 | 7/2003 | Shang |

FOREIGN PATENT DOCUMENTS

| | | |
|---|---|---|
| JP | 2000-311324 | 11/2000 |
| KR | 98011386 | 4/1998 |

OTHER PUBLICATIONS

Michael W. Davis, "A New Spin On Suspension Windage", *Insight Magazine*, Mar./Apr. 2001 (7 pages).

B.-C. Kim et al., "Computer Mechanics Laboratory Technical Report No. 99-015—Suppressing Turbulence Induced Vibration of the Head Suspension Assembly in a Hard Disk Drive", Dept. of Mechanical Engineering, University of California, Berkeley, CA., Aug. 1999, pp. 1-23.

* cited by examiner

REVERSE FLOW DISK DRIVE AND HEAD SUSPENSION FOR SAME

This is a divisional application of U.S. patent application Ser. No. 09/858,303 filed May 15, 2001 now abandoned entitled Reverse Flow Disk Drive and Head Suspension for the Same, which claims the benefit of U.S. Provisional Patent Application Ser. Nos. 60/205,344 filed May 18, 2000 entitled Means of Reducing Windage Generated Off-Tracking by Reversing the Platters Spin Direction; 60/217,789 filed Jul. 12, 2000 entitled Flexure for Reducing Windage Generated in Reverse Flow Drive; and 60/221,758 filed Jul. 31, 2000 entitled Suspension/E-Block Based Downstream Air Dam for Reverse Flow Drive (Dam Located Downstream of HGA).

BACKGROUND OF THE INVENTION

1. Field of the Invention

The present invention relates to a reverse flow disk in a data storage device and to a head suspension for supporting a read/write head in a reverse flow disk. Airflow induced vibration is reduced over the current state of the art by rotating the disks so that the read/write heads are upstream of the rigid region of the head suspension relative to the air flowing with the disks. Certain flexures and electrical connections enable conventional read/write heads to be used in the present reverse flow disk drive. Additional reductions in airflow induced vibrations can be achieved with the placement of downstream attenuators.

2. Description of the Related Art

Most personal computer systems today employ direct access storage devices (DASD) or rigid disk drives for data storage. A conventional disk drive 20, such as shown in FIG. 1, contains a plurality of magnetically coated recording disks 26 mounted on the spindle for rotation in a direction 24 so that flexure 42 is downstream of load beam 40 relative to airflow 23. The disks 26 could alternatively rotate in a direction opposite to 24 with the airflow 23 also moving in the opposite direction from shown in FIG. 1, provided that head suspension 32 is oriented so that the flexure 42 is downstream of the load beam 40.

The disks 26 contain a plurality of disk features. As used herein, "disk features" refers to discrete magnetic or optical properties of the coated disks. The number of disks 26 and the composition of their magnetic material coating determine, in part, the data storage capacity of the disk drive 20. Positioned adjacent the peripheries of the rotating disks 26 is an E-block 28 having a plurality of actuator arms 30 each supporting one or more head suspensions 32 that extend in cantilever fashion over the disks 26.

FIG. 2 shows the head suspension 32 used to support and properly orient a head slider 34 over the rotating disks 26 of FIG. 1 in more detail. A variety of head suspensions can be used for this purpose, such as disclosed in U.S. Pat. No. 5,920,444 (Heeren et al.). Head suspension 32 has a longitudinal axis 36, and is comprised of a base plate 38, a load beam 40, and a flexure 42. Base plate 38 is mounted to a proximal end 44 of load beam 40, and is used to attach head suspension 32 to the actuator 30 in the disk drive 20. Slider 34 is mounted to flexure 42, and as the disk 26 in the storage device 20 rotates beneath head slider 34, an air bearing is generated between slider 34 and the rotating disk 26 that creates a lift force on head slider 34. This lift force is counteracted by a spring force generated by the load beam 40 of head suspension 32, thereby positioning the slider 34 at an alignment above the disk referred to as the "fly height." Flexure 42 provides the compliance necessary to allow head slider 34 to gimbal in response to small variations in the air bearing generated by the rotating disk.

Load beam 40 of head suspension 32 has an actuator mounting region 46 at proximal end 44, a load region 48 adjacent to distal end 50, a resilient spring region 52 positioned adjacent actuator mounting region 46, and a rigid region 54 that extends between spring region 52 and load region 48. Resilient spring region 52 generates a predetermined spring force that counteracts the lift force of the air bearing acting on head slider 34. Toward this end, spring region 52 can include an aperture 53 to control the spring force generated by spring region 52. Rigid region 54 transfers the spring force to load region 48 of load beam 40. A load point dimple (not shown) is formed in load region 48, and contacts flexure 42 to transfer the spring force generated by spring region 52 to flexure 42 and head slider 34. A load point dimple can alternatively be formed in flexure 42 to extend toward and contact with load region 48 of load beam 40.

The flexure 42 is formed as a separate component and is mounted to load beam 40 near the distal end 50. Flexure 42 includes a gimbal region 56 and a load beam mounting region 58. Load beam mounting region 58 overlaps and is mounted to a portion of rigid region 54 using conventional means, such as spot welds. Gimbal region 56 of flexure 42 provides the necessary compliance to allow head slider 34 to gimbal in both pitch and roll directions about load point dimple in response to fluctuations in the air bearing generated by the rotating disk. Toward this end, gimbal region 56 includes a cantilever beam 60 having a slider mounting surface to which head slider 34 is attached. Cantilever beam 60 is attached to cross piece 62, which is connected at each end to first and second arms 64a and 64b of flexure 42. Cantilever beam 60 is resiliently movable in both pitch and roll directions with respect to the remainder of flexure 42, and thereby allows head slider 34 to gimbal. Load point dimple (when formed in load region 48) contacts the surface opposite the slider mounting surface of cantilever beam 60 to transfer the spring force generated by spring region 52 of load beam 40 to head slider 34, and further to provide a point about which head slider 34 and cantilever beam 60 can gimbal. In dynamic storage devices optical or magnetic read/write heads 66 are supported on a trailing edge 68 of the slider 34. The trailing edge 68 is defined in relation to the direction 24 that the disk 26 rotates.

A continued trend for greater areal density and faster data transfer rates for rigid disk drives place more demand on suspension windage performance. One way to increase areal density is to increase the number of tracks per inch (TPI), which requires a reduction in track misregistration. The suspension's contribution to off-track due to windage excitation must be maintained within ever-tightening track misregistration requirements. One approach to increase the data transfer rate and reduce latency is to increase the disk RPM. Higher disk RPM can negatively impact suspension windage performance because of increased wind energy. For example, if you spin two identical drives at different RPM, the higher RPM drive is going to create a greater amount of wind energy due to increased disk velocity and therefore higher track misregistration. To satisfy the continuing trends of rigid disk drives, tighter track misregistration will require suspensions that exhibit less off-track due to windage when exposed to increase levels of windage energy due to increasing disk speeds.

Interactions that determine the suspension's windage-driven off-track can be generalized into three separate variables: source energy, energy extraction and the transfer function. Windage off-track occurs due to source energy that originates from fast spinning disks. Turbulent effects of the E-block and other drive features also contribute to source energy. One way to describe the magnitude and influence of source energy is with the Bernoulli Equation. Assume that for any given system, off-track is related to dynamic pressure:

$$SourceEnergy \Rightarrow Pressure_{Dynamic} = \frac{1}{2} \cdot FluidDensity \cdot (Velocity)^2$$

Fluid density and fluid velocity are the two primary factors, with velocity having a squared effect. For a given suspension, an increase in dynamic pressure will result in an increase in windage off-track (an increase in source energy with all else remaining constant). In terms of windage, the ideal case is to have disks spinning as slowly as possible, thus creating minimal turbulence.

The second variable is the suspension's efficiency to extract energy from the source. Different suspension designs extract different amounts of energy from a given source, depending on part length, surface area, rail height, headlift feature, etc. The third variable is the suspension's transfer function. After a certain amount of wind energy is absorbed into the suspension, the transfer function dictates how it translates to slider off-track. For all suspension modes, the transfer function dictates a given ratio of output per input. The ideal goal is to have output minimized as much as possible by having the ratio as close to zero as possible.

Turning back to FIG. 1, rotation of the disks 26 creates airflow 23 within the disk drive 20. The actuator arms 30 and the E-block 28 channel the airflow 23 toward the head suspension 32. Air flow 23 encounters the E-block 28 and the actuator arms 30 first, with the head suspensions 32 and flexure 42 located downstream of this obstruction. Consequently, the head suspension 32 is located in the E-block's wake. Any turbulent flow generated by the E-block 28 and/or actuator arm 30 can propagate downstream and strike the head suspension 32. The E-block 28 and actuator arms 30 act as funnels to direct more airflow 23 toward the head suspension 32. According to the conservation of mass flow, as the cross-sectional area of the flow region becomes restricted, the fluid density and/or the velocity must increase to account for the smaller cross-sectional area. Increases in these values increase the magnitude of the dynamic pressure acting on the head suspension 32, thus adding to the windage-induced suspension off-track.

SUMMARY OF THE INVENTION

The present invention relates to a head suspension for a reverse flow disk drive. The head suspension includes a load beam having a mounting region at a proximal end, a rigid region at a distal end and a spring region between the mounting region and the rigid region. A flexure is mounted on the distal end of the rigid region. A slider is mounted on the flexure. The slider has a proximal end closest to the proximal end of the load beam, wherein the spring region, the rigid region, the flexure and the slider comprise an active portion. One or more read/write heads are located on the proximal end of the slider. A plurality of electrical traces extend along the head suspension to the proximal end of the slider. At least one airflow attenuator is provided that creates a region of reduced airflow velocity proximate at least a portion of the active portion.

The flexure can optionally be an inverted gimbal. Any of the embodiments disclosed herein can include one or more airflow attenuators located downstream from the active portion. The airflow attenuators are typically located on one of the mounting region or an inactive portion of an unamount arm. The airflow attenuator are optionally integrally formed with the mounting region. The airflow attenuators can optionally extend along one or more of the side, the top or the bottom of the head suspension. In one embodiment, the airflow attenuators include a shape adapted to create a region of reduced airflow velocity proximate the flexure and/or the active portion.

The present invention is also directed to an actuator assembly and to a reverse flow disk drive. The actuator assembly includes an actuator arm attached to the head suspension. The reverse flow disk drive includes one or more disks and one or more of the head suspensions discussed herein. One or more airflow attenuators can be located downstream from the active portion on the actuator arms on both the actuator assembly and the reverse flow disk drive.

BRIEF DESCRIPTION OF THE SEVERAL VIEWS OF THE DRAWING

Further objects and features of the present invention are set forth in the following detailed description of the preferred embodiments of the invention and in the drawing figures wherein.

DETAILED DESCRIPTION OF THE INVENTION

Figure 3:
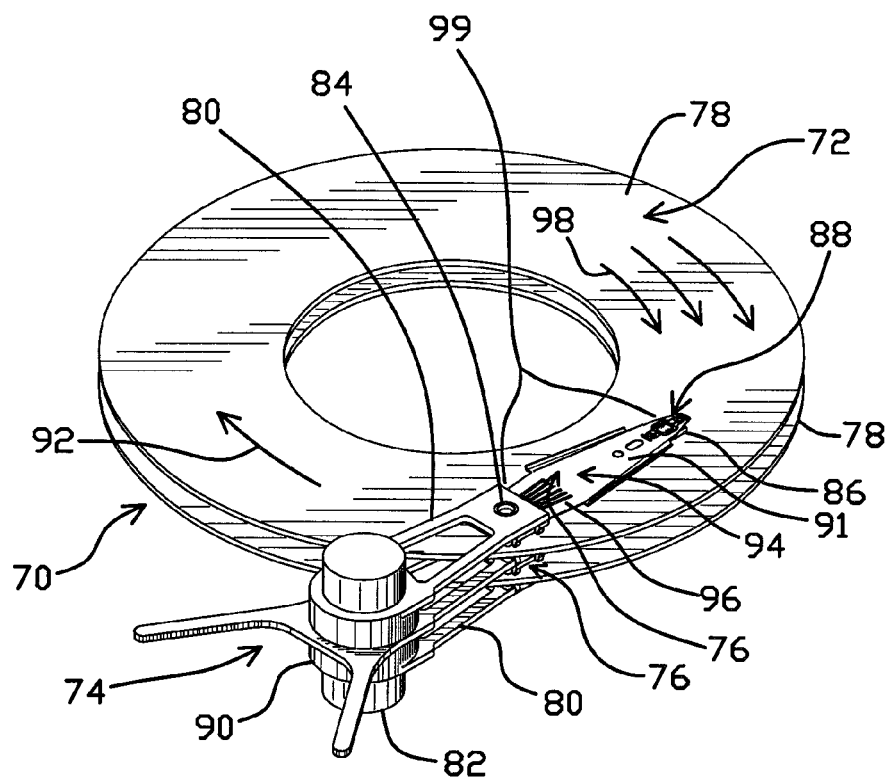
FIG. 3 is a schematic illustration of a reverse flow disk drive in accordance with the present invention.

FIG. 3 illustrates a reverse flow disk drive 70 including a magnetic disk stack 72 and a head stack assembly 74 with head suspensions 76 in accordance with the present invention. As used herein, "reverse flow disk drive" refers to a disk drive in which the disk is rotated in a direction that causes disk features to pass the read/write head(s) before passing the suspension arm. In a reverse flow disk drive, the most distal end of the head suspension leads into the airflow caused by disk rotation.

Disk stack 72 includes one or more spaced disks 78 (two are shown in FIG. 3) mounted to a spindle for rotation by a drive motor. Head stack assembly (or E-block) 74 includes a plurality of actuator arms 80 having proximal ends mounted to actuator shaft 82. The proximal ends of head suspension assemblies 76 are mounted to the distal ends of actuator arms 80 in a conventional manner such as by swage boss 84. Flexure 88 is located at distal end of rigid portion 91 of load beam 94. Slider 86 with a magnetic read/write head is mounted to the flexure 88 of each head suspension assembly 76. Spring region 96 biases the slider 86 against the disk 78. The actuator arms 80 are spaced from one another by spacers 90 in such a manner that the suspensions 76 mounted thereto extend between disks 78 to position the sliders 86 and magnetic heads adjacent to the disk surfaces.

The disks 78 rotate in a direction 92 at several thousand revolutions per minute (RPM) while the disk drive is turned on. Consequently, active portion 99 of the head suspension 76 leads into the airflow 98. As used herein, "active portion" refers to the spring region and all portions of the head suspension distal thereto, including the rigid region and the flexure.

Figure 1:
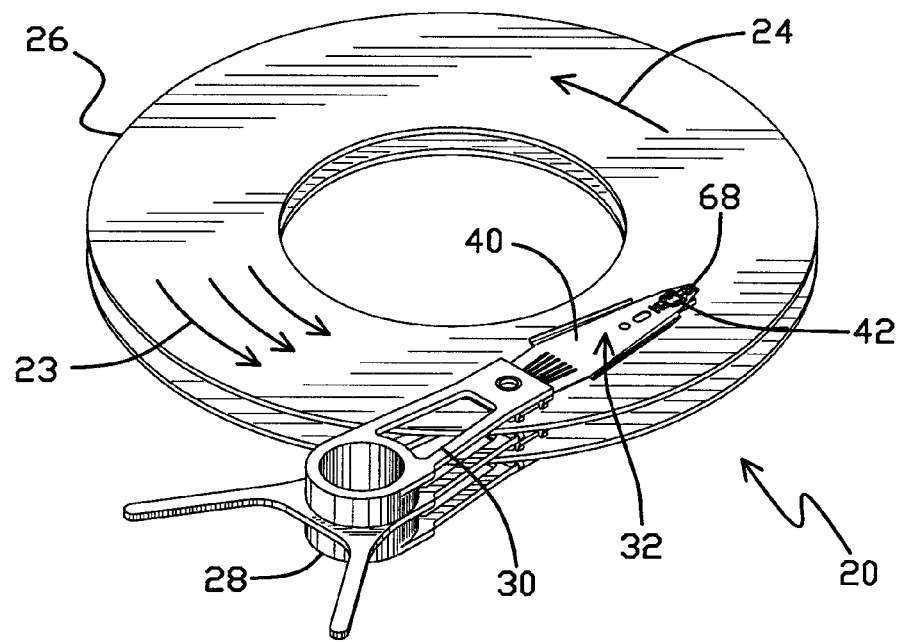
FIG. 1 is a schematic illustration of a prior art disk drive.
Figure 2:
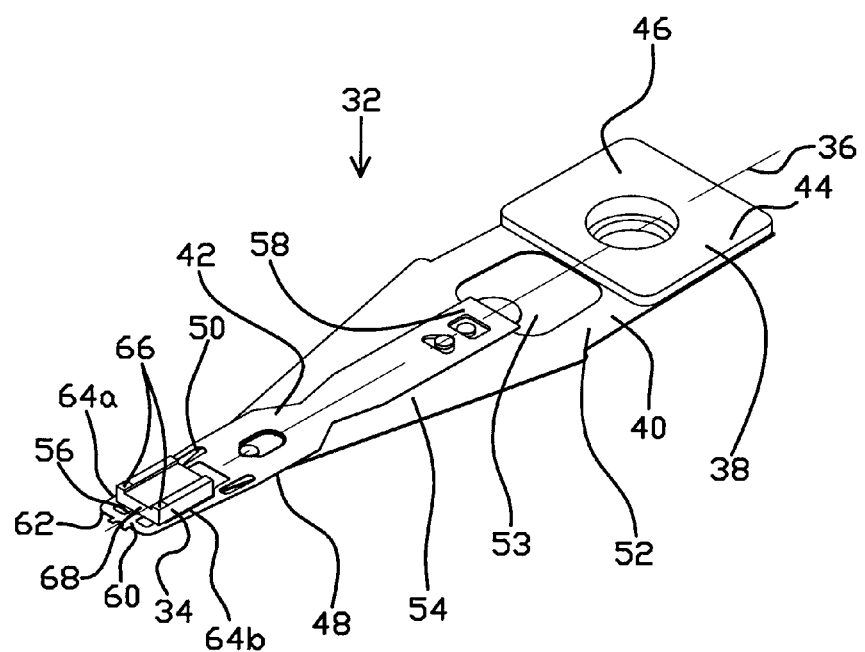
FIG. 2 is a perspective view of a prior art head suspension.

In the reverse flow disk drive 70 illustrated in FIG. 3, the flexure 88 and the slider 86 are located in a more laminar, lower velocity region of the airflow 98 than in the standard flow conditions (see FIG. 1). The airflow 98 progresses down the load beam 94 to the spring region 96, and finally passes the actuator arms 80. The air flow 98 has its greatest energy immediately after passing the actuator arms 80. After passing the actuator arms 80, the airflow 98 has approximately three-quarters of a turn of the disk 78 for turbulence to dissipate before it again strikes the active portion 99 of the head suspension 76. The present reverse flow disk drive 70 does not expose the flexure 88 and slider 86 to the high energy airflow that is found immediately downstream of the actuator arms 80, as occurs in a conventional disk drive (see FIG. 1). As used herein, "downstream" is relative to the airflow generated by rotation of the disks in the disk drive.

Figure 3A:
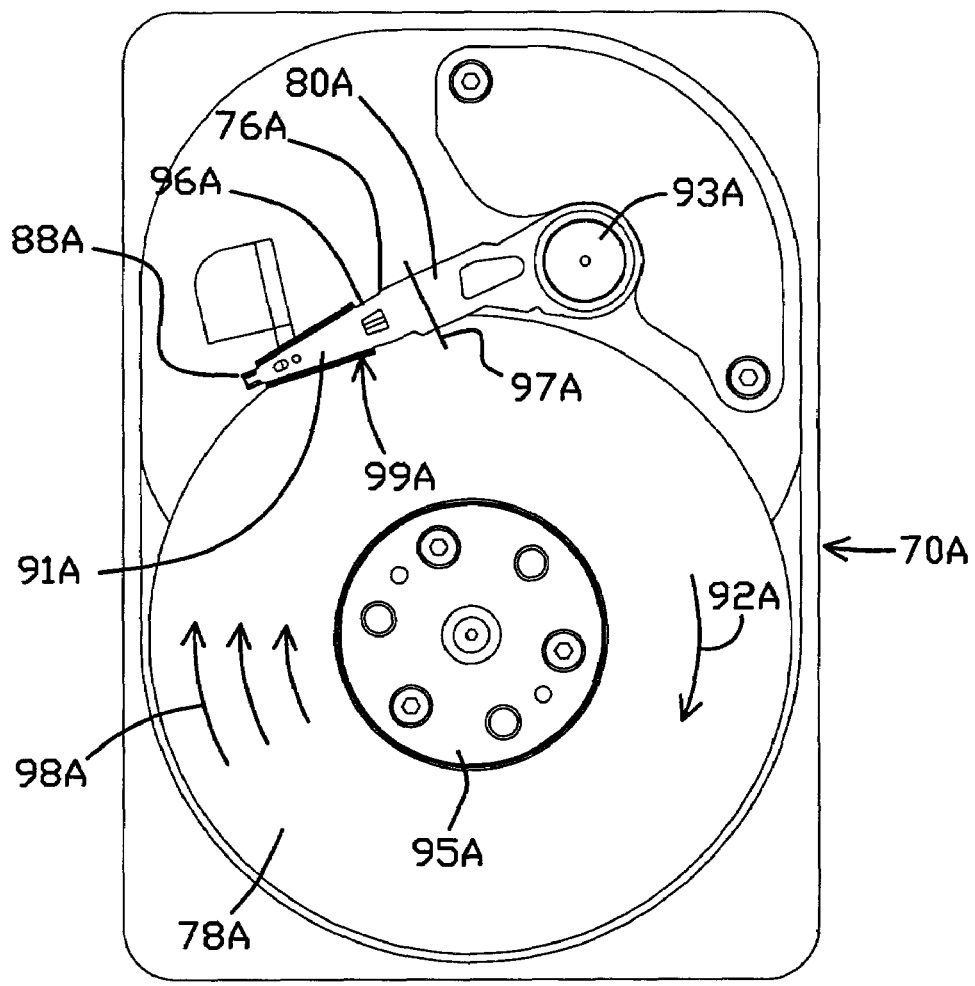
FIG. 3A is a schematic illustration of an alternate reverse flow disk drive including an unamount arm in accordance with the present invention.

FIG. 3A illustrates an alternate reverse flow disk drive 70A in which the actuator arms 80 and the head suspension assembly 76 are replaced with a single structure referred to as an unamount arm 76A. The unamount arm 76A is typically attached directly to actuator column 93A. Portion 80A of the unamount arm 76A comprises a fairly rigid inactive portion of the head suspension 76 that is resistant to airflow induced vibrations. Spring region 96A, rigid region 91A and flexure 88A comprise the active portion 99A in the head suspension assembly 76A of FIG. 3A. The disks 78A rotate on spindle 95A in the direction 92A so that the airflow 98A first encounters flexure 88A and then progresses down the rigid region 91A, the spring region 96A and the portion 80A. The active portion 99A leads into the airflow 98A, as discussed above. In one embodiment, inactive portion 80A includes an airflow attenuator 97A, discussed in detail below.

FIGS. 4–9 are directed to various head gimbal assemblies suitable for use in the present reverse flow disk drive.

Figure 4:
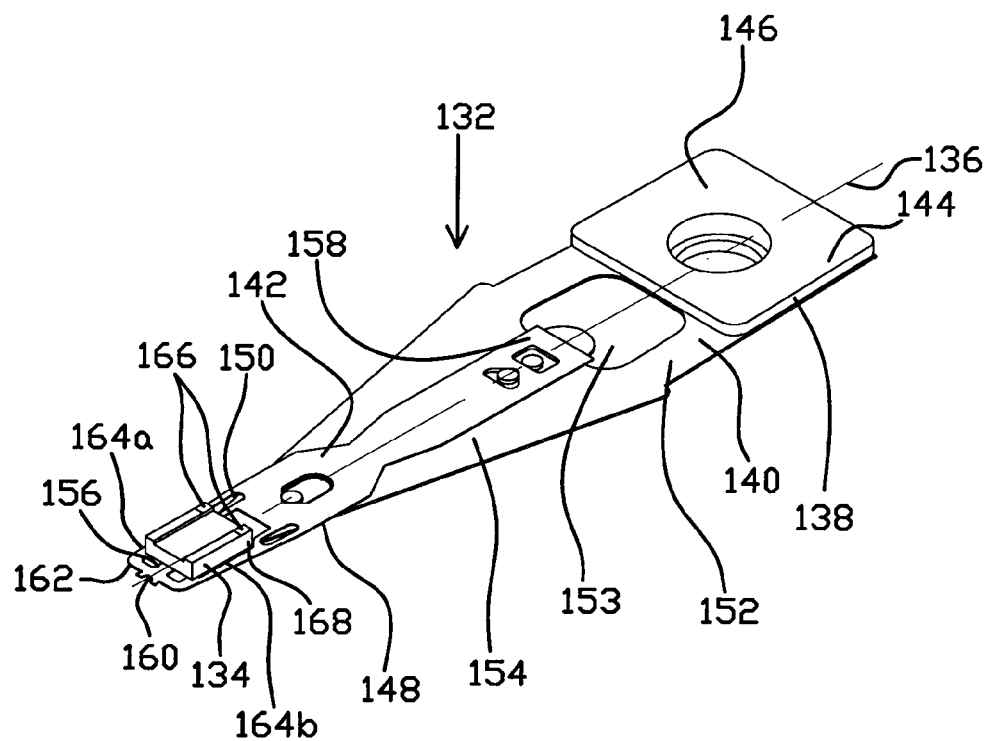
FIG. 4 is a perspective view of a head suspension for use in a reverse flow disk drive in accordance with the present invention.

FIG. 4 shows one embodiment of the head suspension 132 used to support and properly orient a head slider 134 over the rotating disk 126 (see FIG. 3). Head suspension 132 has a longitudinal axis 136, and is comprised of a base plate 138, a load beam 140, and a flexure 142. Base plate 138 is mounted to a proximal end 144 of load beam 140, and is used to attach mounting region 146 of head suspension 132 to the actuator 130 in the disk drive 120. Slider 134 is mounted to flexure 142, and as the disk 126 in the storage device 120 rotates beneath head slider 134, an air bearing is generated between slider 134 and the rotating disk 126 that creates a lift force on head slider 134. This lift force is counteracted by a spring force generated by the load beam 140 of head suspension 132, thereby positioning the slider 134 at an alignment above the disk referred to as the "fly height." Flexure 142 provides the compliance necessary to allow head slider 134 to gimbal in response to small variations in the air bearing generated by the rotating disk 126.

Flexure 142 includes a gimbal region 156 and a load beam mounting region 158. Load beam mounting region 158 overlaps and is mounted to a portion of rigid region 154 using conventional means, such as spot welds. Gimbal region 156 of flexure 142 provides the necessary compliance to allow head slider 134 to gimbal in both pitch and roll directions about load point dimple in response to fluctuations in the air bearing generated by the rotating disk.

Toward this end, gimbal region 156 includes a cantilever beam 160 having a slider mounting surface to which head slider 134 is attached. Cantilever beam 160 is attached to cross piece 162, which is connected at each end to first and second arms 164a and 164b of flexure 142. Cantilever beam 160 is resiliently movable in both pitch and roll directions with respect to the remainder of flexure 142, and thereby allows head slider 134 to gimbal. Load point dimple (when formed in load region 148) contacts the surface opposite the slider mounting surface of cantilever beam 160 to transfer the spring force generated by spring region 152 of load beam 140 to head slider 134, and further to provide a point about which head slider 134 and cantilever beam 160 can gimbal.

Optical or magnetic read/write heads 166 are preferably supported on a trailing edge 168 of the slider 134. The trailing or downstream edge 168 is defined in relation to the airflow 98 illustrated in FIG. 3. Since the disks 72 rotate in the opposite direction than illustrated in FIG. 1, the trailing edge 168 is the edge of the slider 134 closest to the proximal end 144. Locating the read/write heads 166 at the trailing edge 168 of the slider 134 maintains the flying characteristics of the head suspension 132 when used in a reverse flow disk drive. In one embodiment, slider 134 is a conventional slider rotated 180 degrees so that the read/write heads 166 are oriented as shown.

Figure 5:
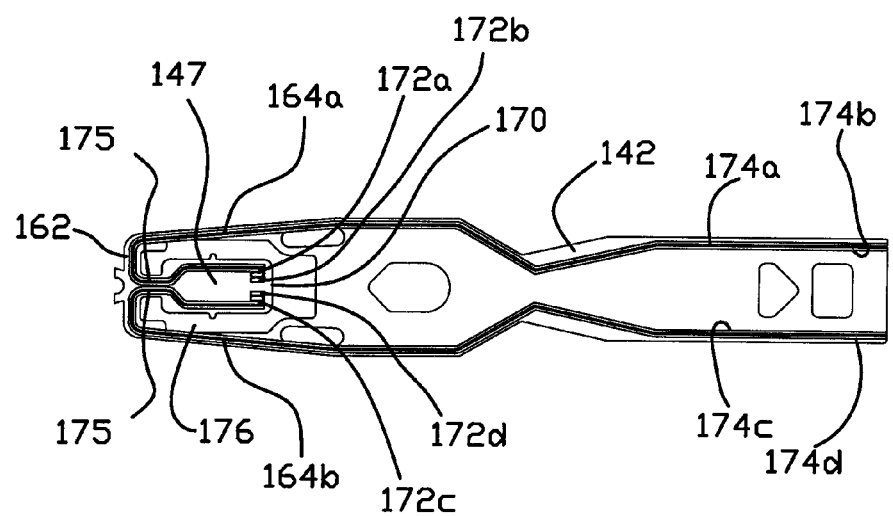
FIG. 5 is a bottom view of a flexure in accordance with the present invention.

FIG. 5 is a bottom view of the flexure 142 of FIG. 4 with the slider 134 removed. Electrical wires, traces or integrated leads 174a, 174b, 174c, 174d (referred to collectively as "174") extend along the first and second arms 164a, 164b and the cross piece 162 to the proximal edge 170 of the slider mounting surface 147. Various other suitable trace configurations are disclosed in U.S. Pat. No. 6,046,888 (Krinke et al.). Slider mounting surface 147 is attached to the cross piece 162 in a cantilevered fashion so that gap 176 is formed around several sides of the surface 147, including along the proximal edge 170. Consequently, contact pads 172a, 172b, 172c, 172d are located adjacent to the proximal edge 170 for electrical coupling with the read/write heads 166 (see FIG. 4).

In one embodiment, the traces 174a, 174b, 174c, 174d comprise multiple segments. Segments 175 of the traces 174 may be a simple electrical conductor or some other device, such as a micro-actuator (see for example U.S. Pat. Nos. 5,994,159, 5,923,798, 5,912,094 and 6,046,888), a sensor, an integrated circuit chip, such as a pre-amplifier, or a variety of other devices. The electrical traces used on any of the embodiments disclosed herein can be formed using a variety of techniques, including wireless or integrated leads made by an additive deposition process, a trace carrier laminate, or a wireless flexure, such as disclosed in U.S. Pat. No. 5,982,584.

Figure 6:
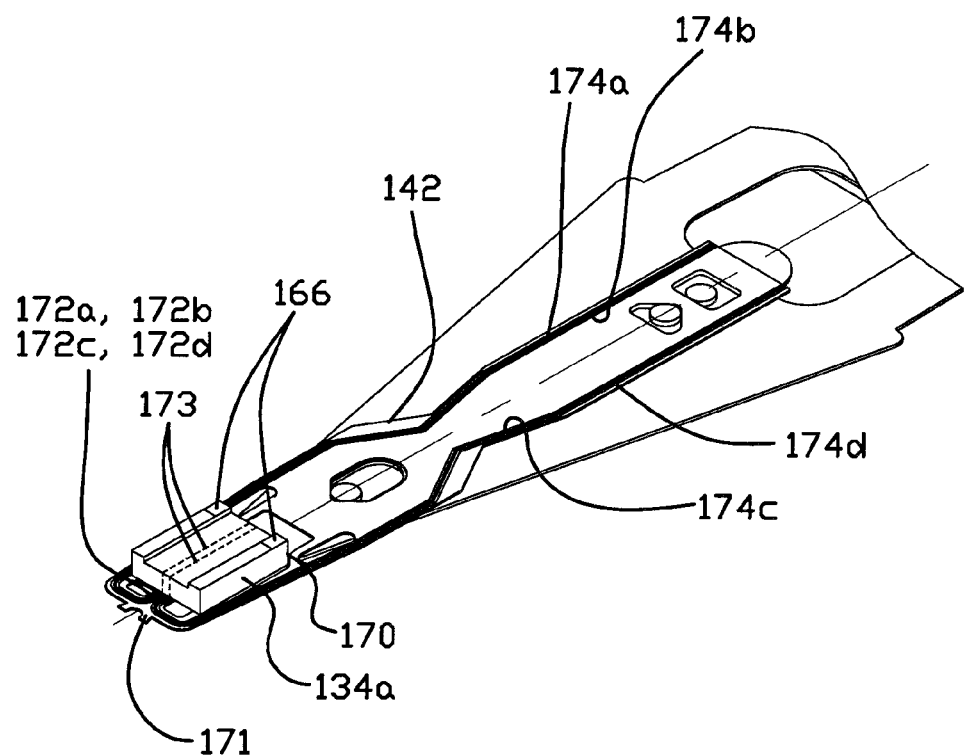
FIG. 6 is a perspective view of an alternate head suspension in accordance with the present invention.

FIG. 6 is a bottom view of the flexure 142 with a modified slider 134a and modified traces 174a, 174b, 174c, 174d (referred to collectively as "174") in accordance with the present invention. The traces 174 terminate at the distal edge 171 of the slider mounting surface (see FIG. 5). Contact pads 172a, 172b, 172c, 172d (referred to collectively as "172") are located near the distal edge 171. The modified slider 134a includes integral electrical conductors 173 that electrically couple the contact pads 172 to the read/write heads 166 near the proximal edge 170. The electrical conductors 173 can be internal or external to the slider 134a.

Figure 7:
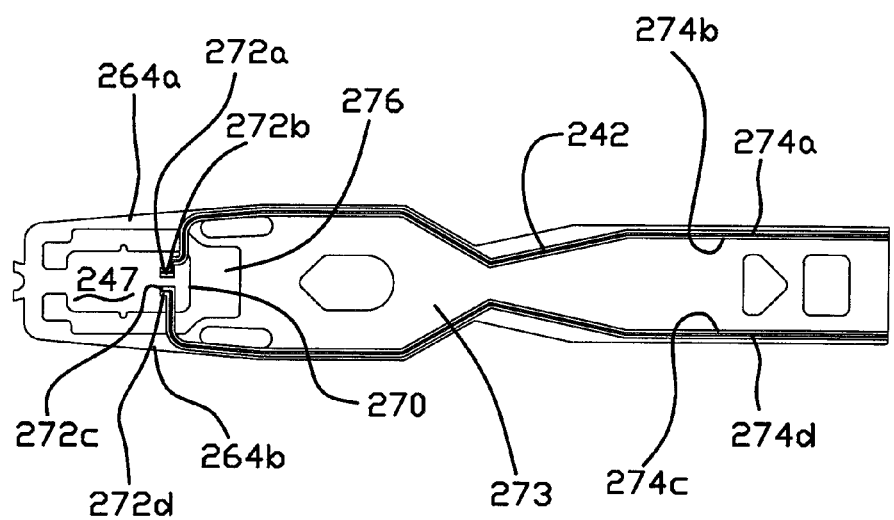
FIG. 7 is a bottom view of an alternate flexure in accordance with the present invention.

FIG. 7 is a bottom view of an alternate flexure 242 in which electrical traces 274a, 274b, 274c, 274d extend across gap 276 between the slider mounting surface 247 and the first and second arms 264a, 264b to the proximal edge 270 of the slider mounting surface 247. Contact pads 272a, 272b, 272c, 272d are located adjacent to the proximal edge 270 for electrical coupling with the read/write heads 166 oriented toward the proximal end 273 (see FIG. 4).

Figure 8:
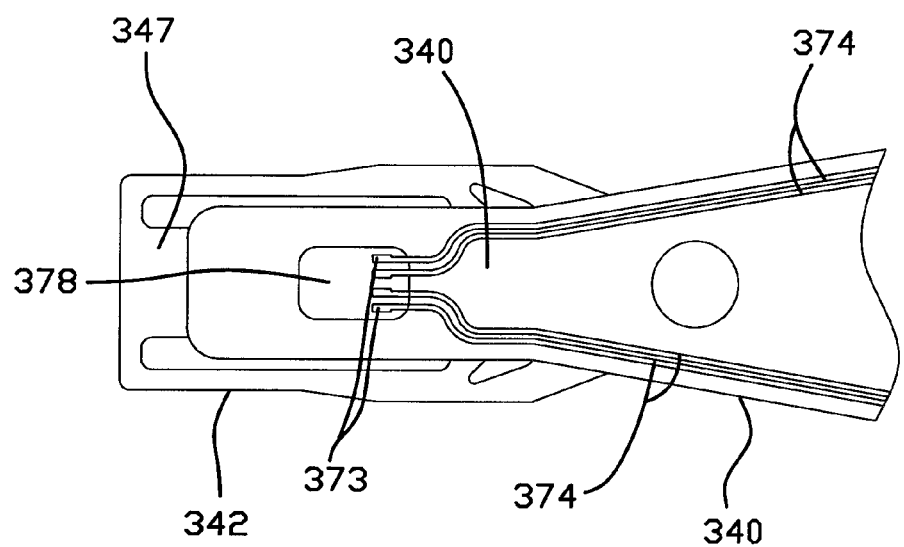
FIG. 8 is a top view of a load beam and flexure in accordance with the present invention.

FIG. 8 is a top view of another alternate flexure 342 in which the electric traces 374 extend along the load beam 340. A hole or via 378 is formed in the load beam 340 and the slider mounting surface 347 on the gimbal 342 so that distal ends 373 of the traces 374 can be electrically coupled with the slider. Consequently, no integrated leads need be formed on the flexure 342.

Figure 9:
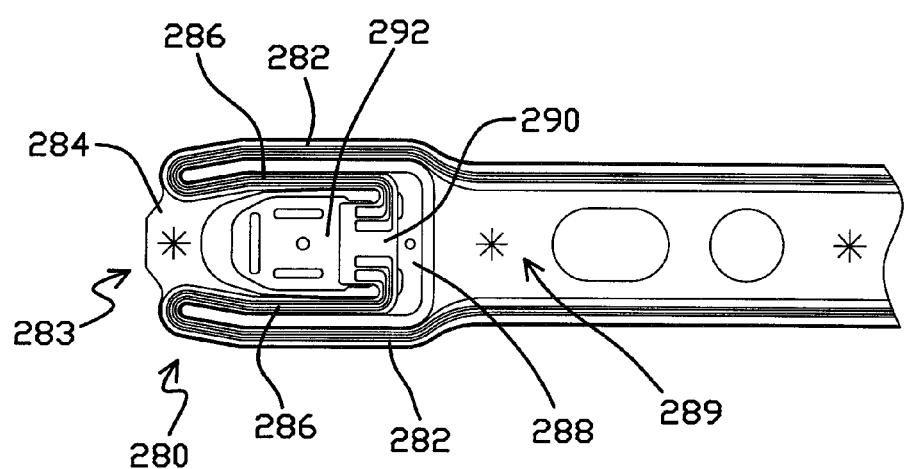
FIG. 9 is a bottom view of a flexure with an inverted gimbal for use in a reverse flow disk drive in accordance with the present invention.

FIG. 9 is a bottom view of an inverted gimbal 280 for use with the present reverse flow disk drive. A pair of outer arms 282 are attached to a distal cross piece 284 at distal end 283 that connects to a pair of inner arms 286. The inner arms 286 connect to a proximal cross piece 288 adjacent proximal end 289 of the inverted gimbal 280. The proximal cross piece 288 is connected to the cantilever beam 290 and a slider mounting surface 292. The traces 294 are routed along the outer arms 282, the distal cross piece 284, the inner arms 286 and the proximal cross piece 288 to the slider mounting surface 292. As used herein, "inverted gimbal" refers to a gimbal with a cantilever beam located on the proximal side of the slider mounting surface. In one embodiment, distal cross piece 284 is welded to the load beam (not shown) on the distal side of the gimbal 280 to minimize the risk of buckling. The inverted gimbal 280 permits the use of conventional sliders with the read/write heads oriented toward the proximal end 289 (see FIG. 4).

Figure 10:
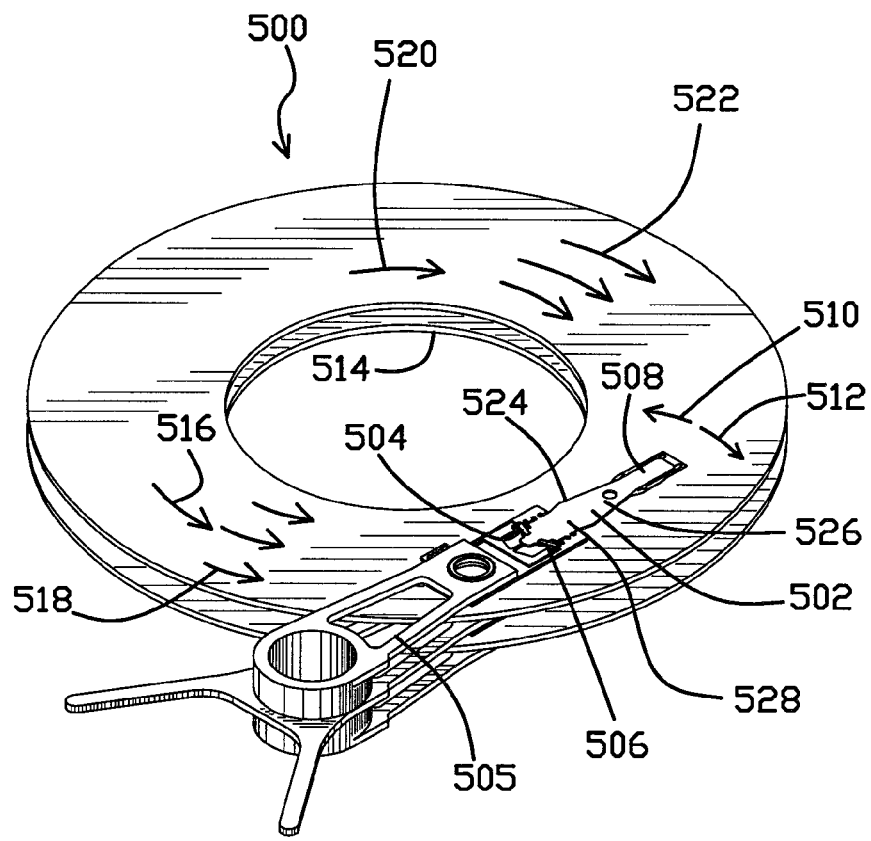
FIG. 10 is a perspective view of a reverse flow disk drive with a micro-actuated head suspension in accordance with the present invention.

FIG. 10 illustrates a reverse flow disk drive 500 with a micro-actuated head suspension assembly 502. In the illustrated embodiment, the micro-actuator comprises motors 504 and 506. The motors 504, 506 can each be biased with a voltage so that active portion 524 is deflected along tracking axis 510 or 512 in response to a tracking control signal. In head suspension assemblies with a micro-actuator, the active portion 524 typically refers to flexure 508, rigid region 526 and spring region 528. The micro-actuator can be piezoelectric, electro-strictive, magnetic field generating coils, micro-electro-mechanical devices (MEMS), micro-optical-electro-mechanical devices (MOEMS), or the like. Since piezoelectric elements or electro-strictive elements do not use magnetic field generating coils, use of such elements reduces the likelihood of interference between microactuator tracking signals and read/write processes and are generally preferred. Other suitable head suspension including a micro-actuator are disclosed in U.S. Pat. No. 6,046,888 (Krinke et al.).

In a conventional disk drive, the disk 514 rotate in a direction 516. The kinetic energy of the resulting airflow 518 is increased when it encounters actuator arms 505 and the micro-actuated suspension assembly 502. The higher energy and higher velocity airflow 518 increases airflow induced vibrations to the active portion 524. In the present reverse flow disk drive 500, the disks 514 rotate in a direction 520 so that the active portion 524 leads into the resulting airflow 522, with a significant reduction in airflow induced vibration, as discussed herein.

Further reductions in suspension windage can be achieved with the addition of downstream airflow attenuators. The downstream airflow attenuators work by reducing the velocity of the air in the region where the head suspension is located. The airflow attenuators work by creating a zone with higher static pressure (lower velocity) air around the head suspension. Oncoming air is diverted by the zone of higher static pressure. The reduction in airflow velocity causes an overall reduction in dynamic pressure.

Figure 11:
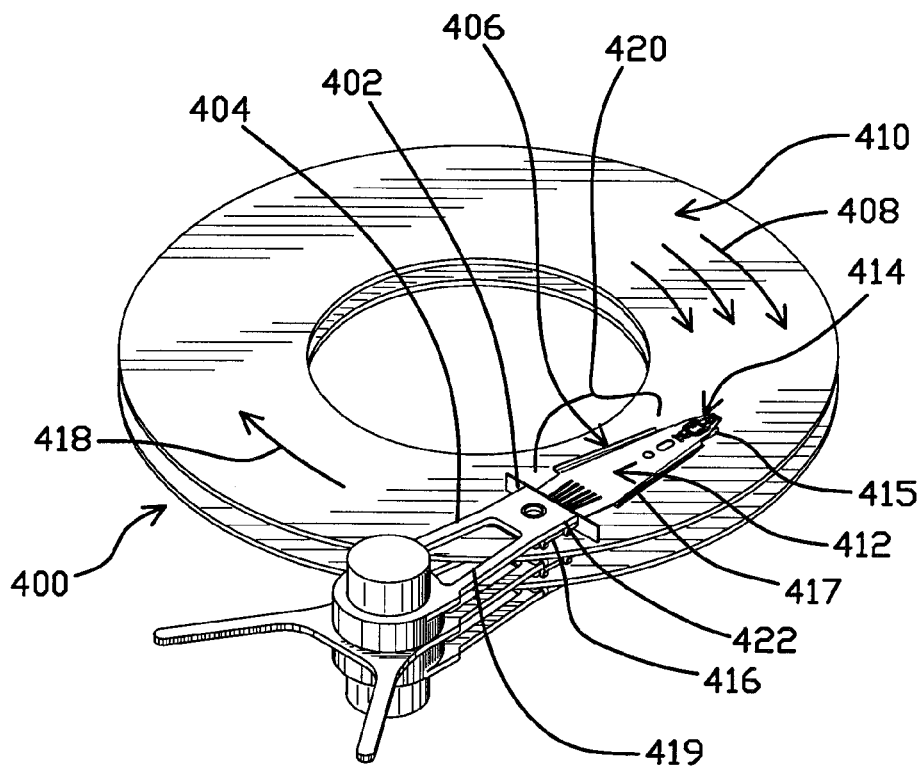
FIG. 11 is a schematic illustration of a reverse flow disk drive including an attenuator in accordance with the present invention.

FIG. 11 illustrates a reverse flow disk drive 400 incorporating a downstream airflow attenuator 402 downstream of active portion 420, and in particular, downstream of head gimbal assembly 414. The attenuator 402 can be located on the actuator arms 404 or on inactive portion 422 of the head suspension assembly 406. The inactive portion 422 of the head suspension assembly 406 is the portion downstream of the active portion 420, typically the mounting region and/or the base plate 416. In one embodiment, the attenuator 402 is located at the interface between the base plate 416 and the actuator arm 404.

As used herein, "attenuator" refers to a structure located downstream from the active portion whose primary function is to reduce the velocity and kinetic energy of the airflow in a region adjacent to the active portion. While the head gimbal assembly in a reverse flow disk drive redirects a portion of the airflow, the amount of airflow that is redirected is significantly less than that redirected by an attenuator. Attenuators also extend beyond the boundaries of the head suspension assembly and/or the actuator arm(s). For some embodiments, the effective surface area of an attenuator can be measured as a function of the length of the head suspension measured from the proximal edge of the mounting region to the distal end of the flexure. For example, an attenuator with a surface area of about 10.0 millimeters$^2$ divided by a head suspension with a length of about 8.5 millimeters produces a ratio of 1.18 millimeters.

In the embodiment of FIG. 11, the attenuator 402 has a leading edge with an effective surface area that encounters the airflow 408 greater than the effective surface area of the leading edge 415 of the head gimbal assembly 414. As used herein, "leading edge" refers to the entire front edge of a particular structure that directly encounters the airflow.

In the illustrated embodiment, the attenuator 402 extends on both side of the head suspension assembly 406. In an alternate embodiment, the attenuator 402 may extend along one side, the top and/or the bottom of the head suspension assembly 406. In yet another embodiment, the disk drive 400 may include an attenuator on both the actuator arms 404 and the head suspension assembly 406. Due to the nature of the reverse flow disk drive 400, attenuators 402 can be located on the actuator arms 404, the E-block, an unamount arm (see FIG. 3A), and/or the base plate (see FIGS. 12–14).

As the airflow 408 travels around the attenuator 402, the airflow in the region 412 immediately upstream of the attenuator 402 has a lower velocity and a lower kinetic energy. The reduced velocity is due to the attenuator 402 restricting the airflow 408, thus partially shielding the head suspension 406 from the airflow 408 and promoting more of the airflow 408 to choose a path of least resistance on either side of the attenuator 402. What remains of the airflow 408 in the region upstream of the attenuator 402 has a lower velocity and lower kinetic energy. As a result, the head gimbal assembly 414 is located in a region of reduced velocity and energy. Use of attenuators in reverse flow disk drives can further reduce airflow induced vibration of the head suspension.

As used herein, "airflow velocity" and "airflow kinetic energy" are preferably measured in a region away from the head suspension 406 and actuator arms 419. Regions of reduced velocity and regions of reduced kinetic energy near the head gimbal are measured relative to the airflow velocity and airflow kinetic energy immediately downstream of the base plate and/or the actuator arms.

The attenuators of the present invention can be designed and manufactured in a variety of ways and shapes. The attenuator can be of various sizes and geometry designed to focus the optimal effect in the region of the flexure and slider. The size, shape, location and number of attenuators can vary with the application. One possible trade-off is power consumption. The larger the attenuator, the more drag that may be put on the drive motor, requiring more energy to maintain disk rotation.

Figure 12:
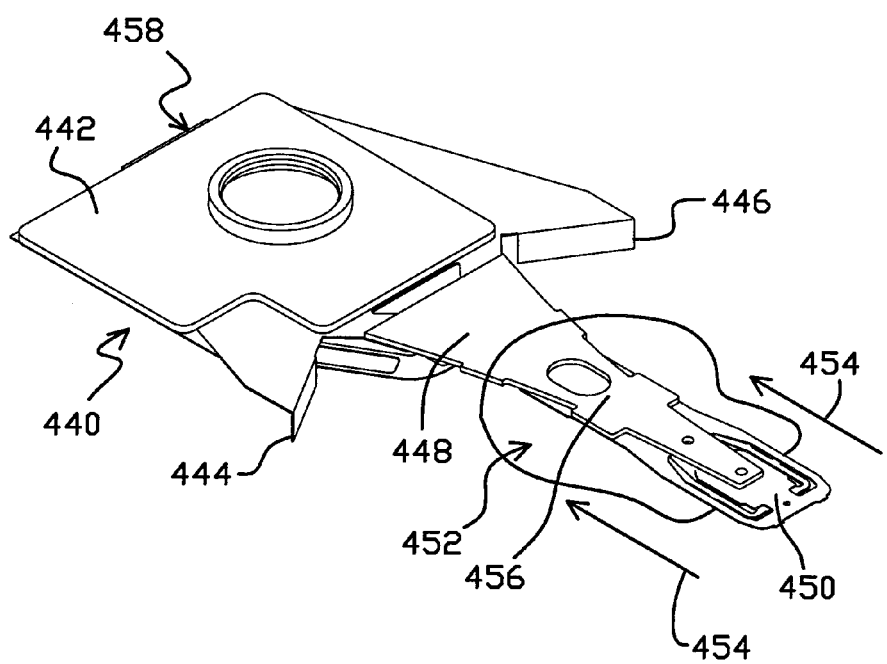
FIGS. 12–14 illustrate various embodiments of head suspension assemblies including attenuators in accordance with the present invention.

FIG. 12 is a schematic illustration of a head suspension assembly 440 in accordance with the present invention. A pair of attenuators 444, 446 are formed integrally from the same material forming the load beam and positioned on both sides of the load beam stiffener 448. Partial etch lines can be formed to facilitate bending of the attenuators 444, 446. Although the attenuators 444, 446 are located on both sides of the load beam stiffener 448, an attenuator on only one side of the stiffener 448 is possible. In the embodiment of FIG. 12, the base plate 442 and the attenuators 444, 446 comprise the inactive portion 458. The inactive portion is located downstream from active portion 456 in a reverse flow disk drive (see FIG. 3). Alternatively, the attenuators 444, 446 can be formed integrally with the base plate 442 or as separate component(s) attached to the base plate 442 by spot welding, adhesive, or a variety of other techniques.

The attenuators 444, 446 optionally extend downward below the level of the load beam stiffener 448. The attenuators 444, 446 are also swept forward toward the head gimbal assembly 450. The shape of the attenuators 444, 446 can be modified to alter the shape of the region 452 of reduced velocity and reduced kinetic energy created by airflow 454. For some applications, two or more attenuators may be used simultaneously. In another embodiment, the attenuator 402 can be integrally formed with the actuator arms (or e-block).

Figure 13:
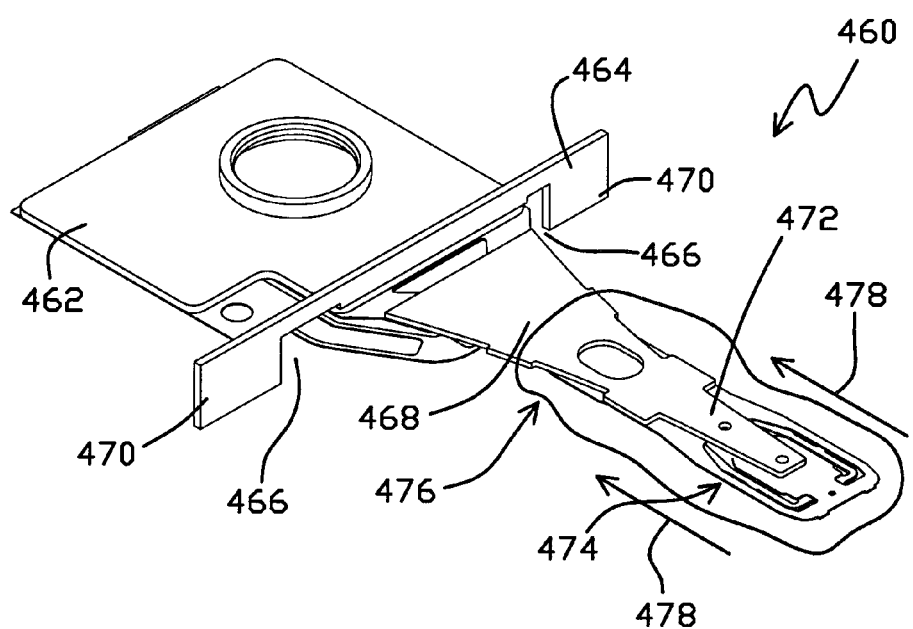

FIG. 13 is a perspective view of an alternate head suspension 460 in accordance with the present invention. Base plate 462 includes an integrally formed attenuator 464 having a pair of cutouts 466 on either side of the load beam stiffener 468. When the attenuator 464 is folded in the upright position illustrated in FIG. 13, portions 470 of the attenuator 464 extend below the load beam stiffener 468. Again, the attenuator 464 can be formed as a separate component and attached to the head suspension assembly 460 using suitable techniques. In the embodiment of FIG. 13, attenuator 464 creates a region 476 of reduced velocity and reduced kinetic energy of airflow 478 around active portion 472 of the head suspension 460. The shape of the region 476 is shown schematically and can very with the shape, size and location of the attenuator 464.

Figure 14:
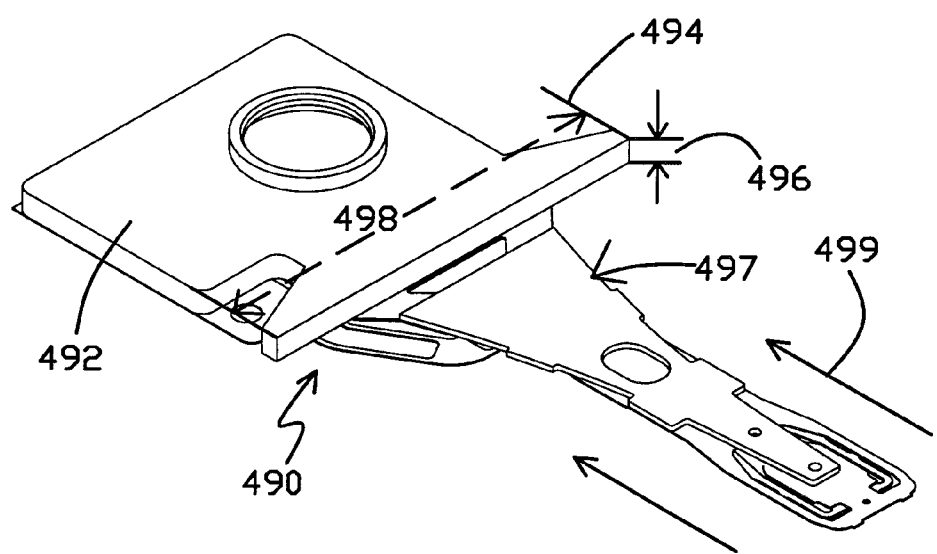

FIG. 14 illustrates an alternate head suspension assembly 490 having an attenuator 494 formed on an edge of reverse base plate 492. Thickness 496 of the base plate 492 times the width 498 of the base plate 492 comprise the effective surface area of the attenuator 494. No additional forming or stamping processes are required. When the base plate 492 is attached to the head suspension assembly 490, the attenuator 494 is positioned downstream of active portion 497 to engage airflow 499, as discussed above.

EXAMPLE 1

FIGS. 15A–D illustrate off-track movement generated by airflow induced vibration within a conventional disk drive. FIGS. 16A–D illustrate off-track movement generated by the same head suspensions evaluated in FIGS. 15A–D in a reverse flow disk drive. FIGS. 15A, 15B, 16A, and 16B illustrate the performance of a Mag 5e micro-actuated head suspensions, available from Hutchinson Technology located in Hutchinson, Minn., at about 10,000 revolutions per minute and about 15,000 revolutions per minute. FIGS. 15C, 15D, 16C, and 16D illustrate the performance of a 4230 TSA head suspensions, also available from Hutchinson Technology located in Hutchinson, Minn., at about 10,000 revolutions per minute and about 15,000 revolutions per minute. The graph indicates the windage generated off track in nanometers.

The z-height indicated on the graphs is the distance between the actuator mount and the disk surface. The sliders were turned about 180 degrees so that the read/write heads were on the downstream side of the slider relative to the airflow, as generally indicated in FIG. 4. The head suspension setup included a gap of about 60 millimeters between the center of rotation of the disks and the center of rotation of the actuator arms. The distance from the center of rotation of the actuator arms to the slider was about 52 millimeters. The distance between the slider and the center of rotation of the disks was about 30 millimeters. There was about a 2.4 millimeter gap between the two adjacent disks. The test was performed with the suspensions between the two spinning disks.

Figure 15A:
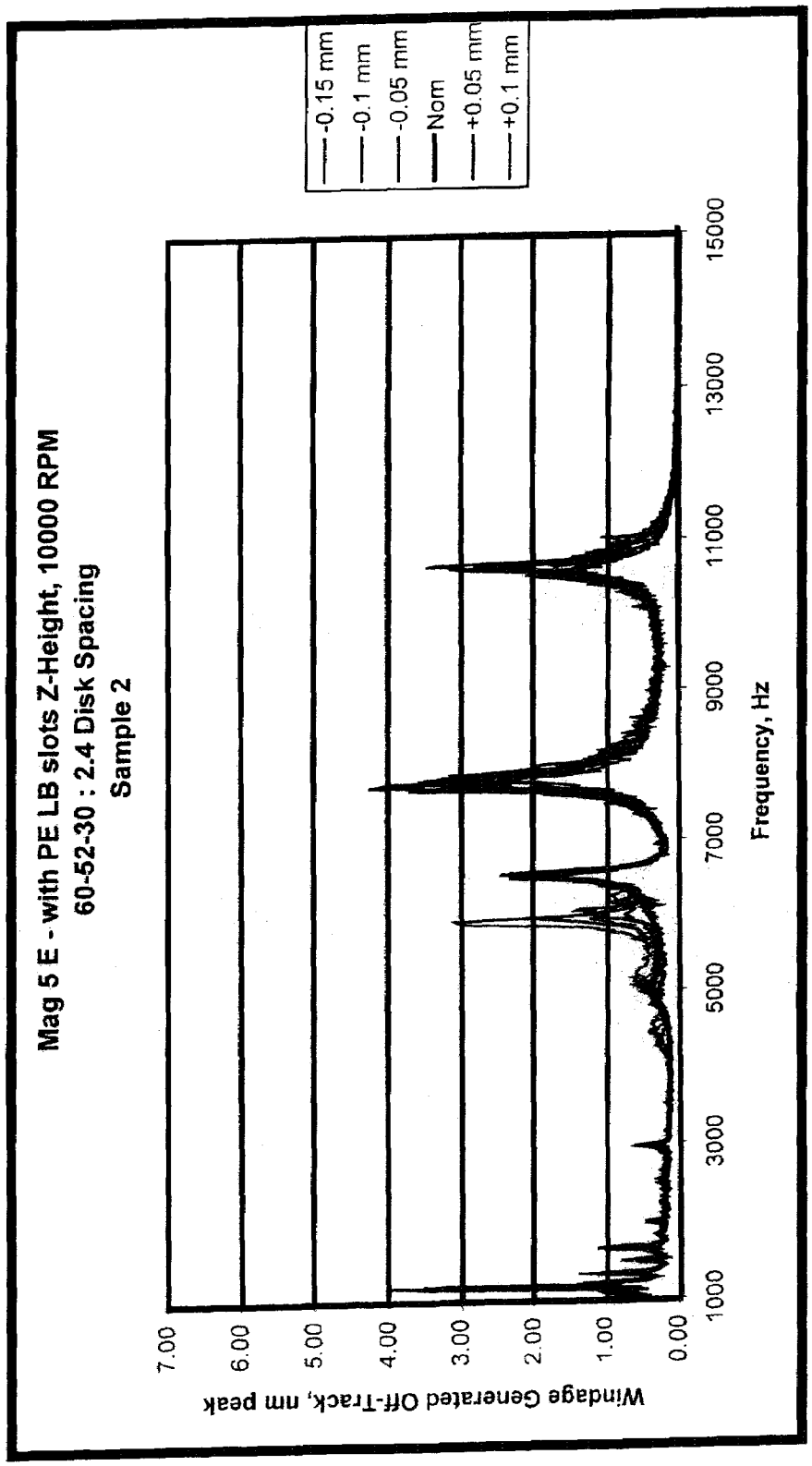
FIGS. 15a–15b are graphical data showing windage off-track for a first head suspension in a conventional disk drive.
Figure 15B:
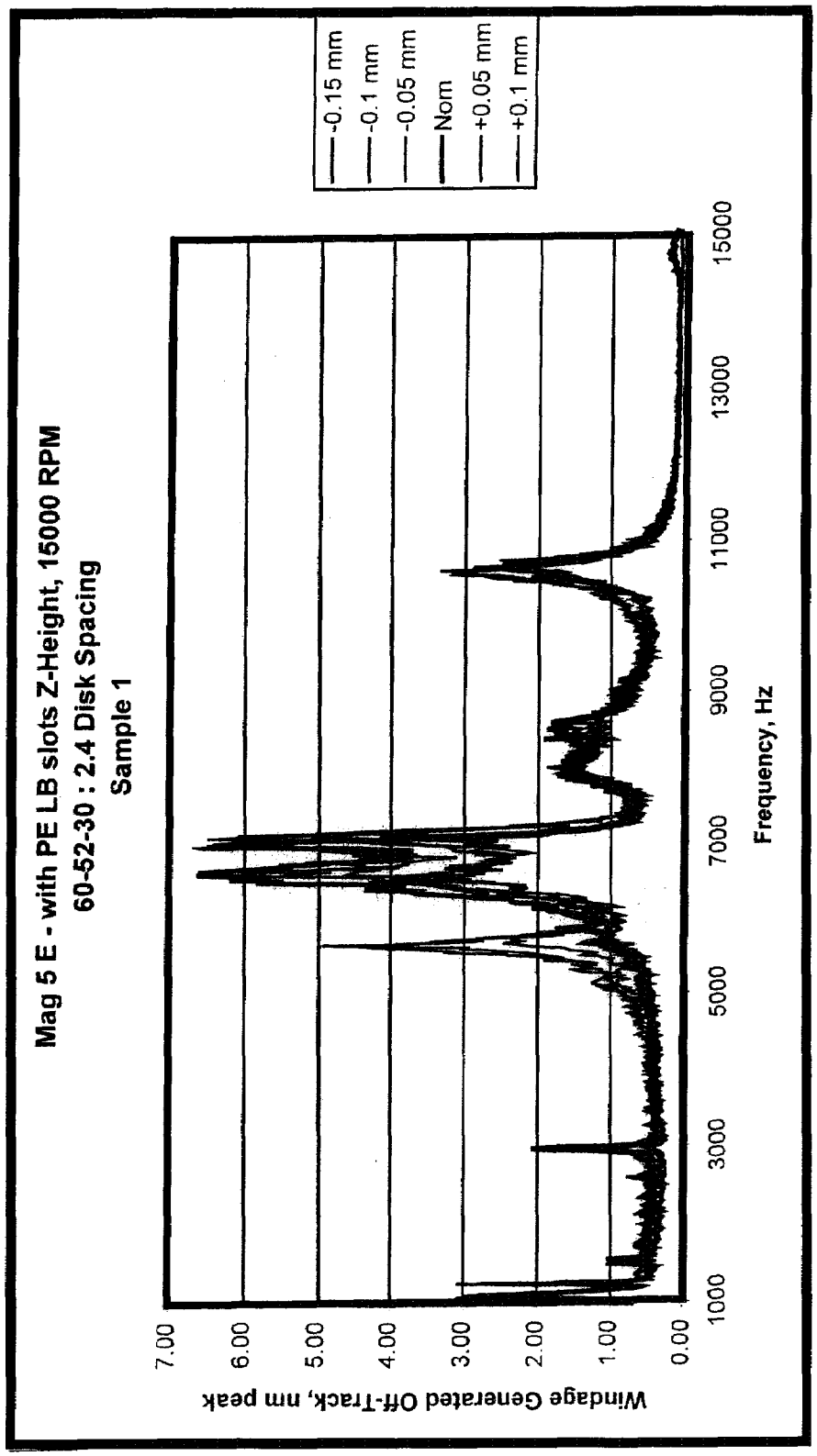
Figure 16A:
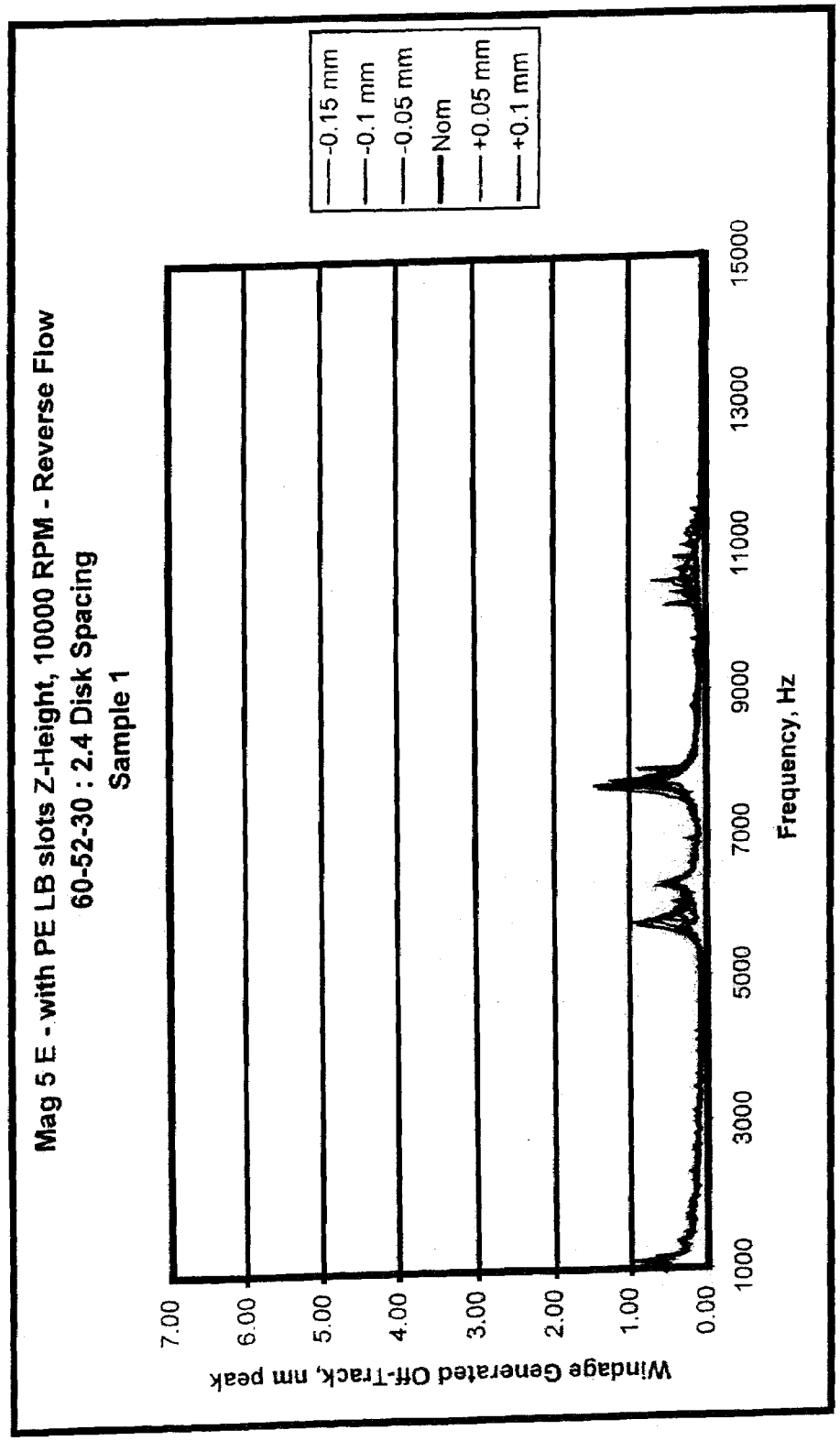
FIGS. 16a–16b are graphical data showing windage off-track in a reverse flow disk drive using the head suspension evaluated in FIGS. 15a–15b.
Figure 16B:
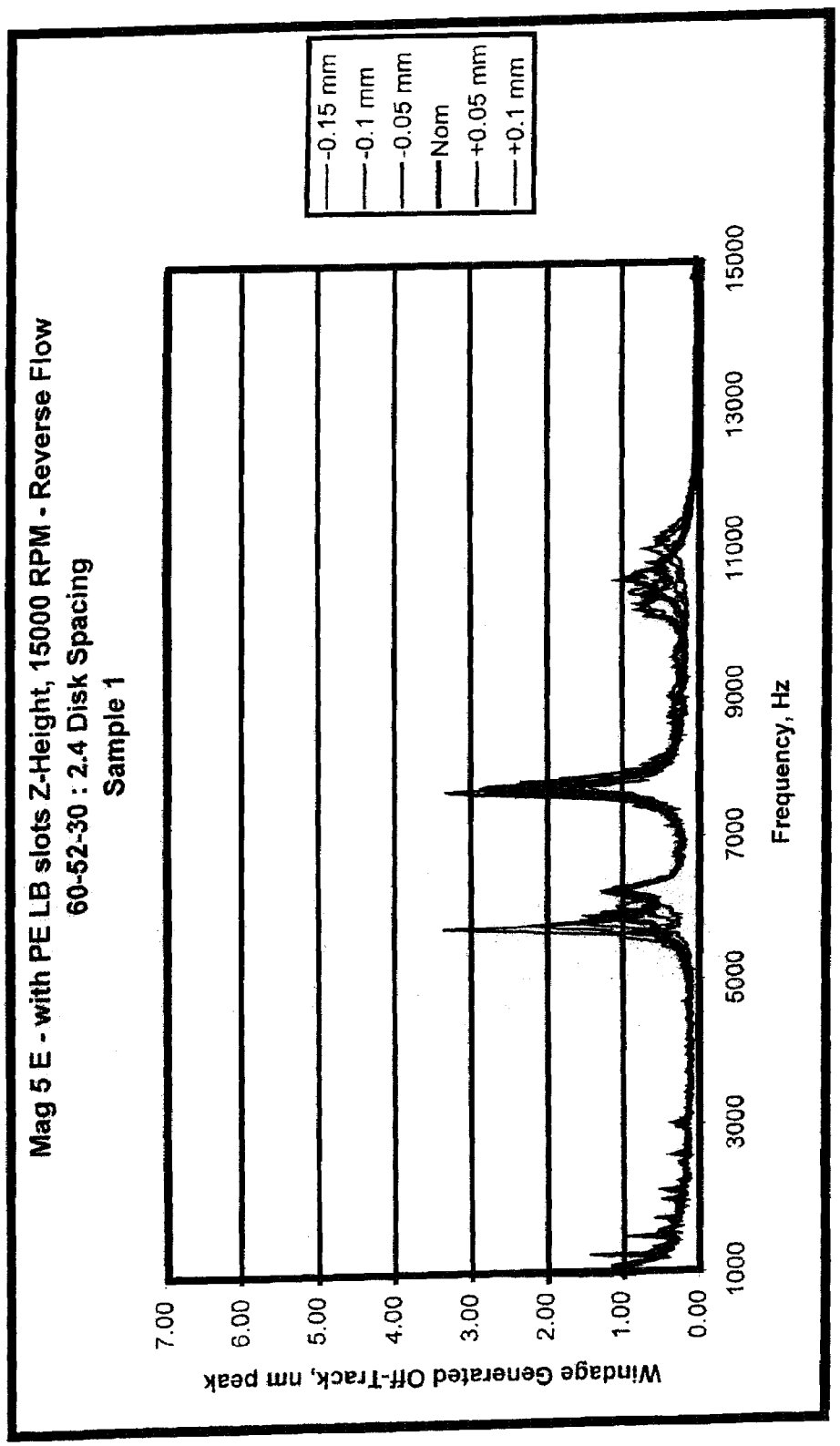

As illustrated in FIG. 16A, at about 10,000 revolutions per minute the Mag 5e micro-actuated head suspension experienced about a 68% reduction in windage induced vibration than the vibration experienced in a conventional disk drive as illustrated in FIG. 15A. As illustrated in FIG. 16B, at about 15,000 revolutions per minute the Mag 5e head suspension experienced about a 67% reduction in windage induced vibration than the vibration experienced in a conventional disk drive as illustrated in FIG. 15B.

Figure 15C:
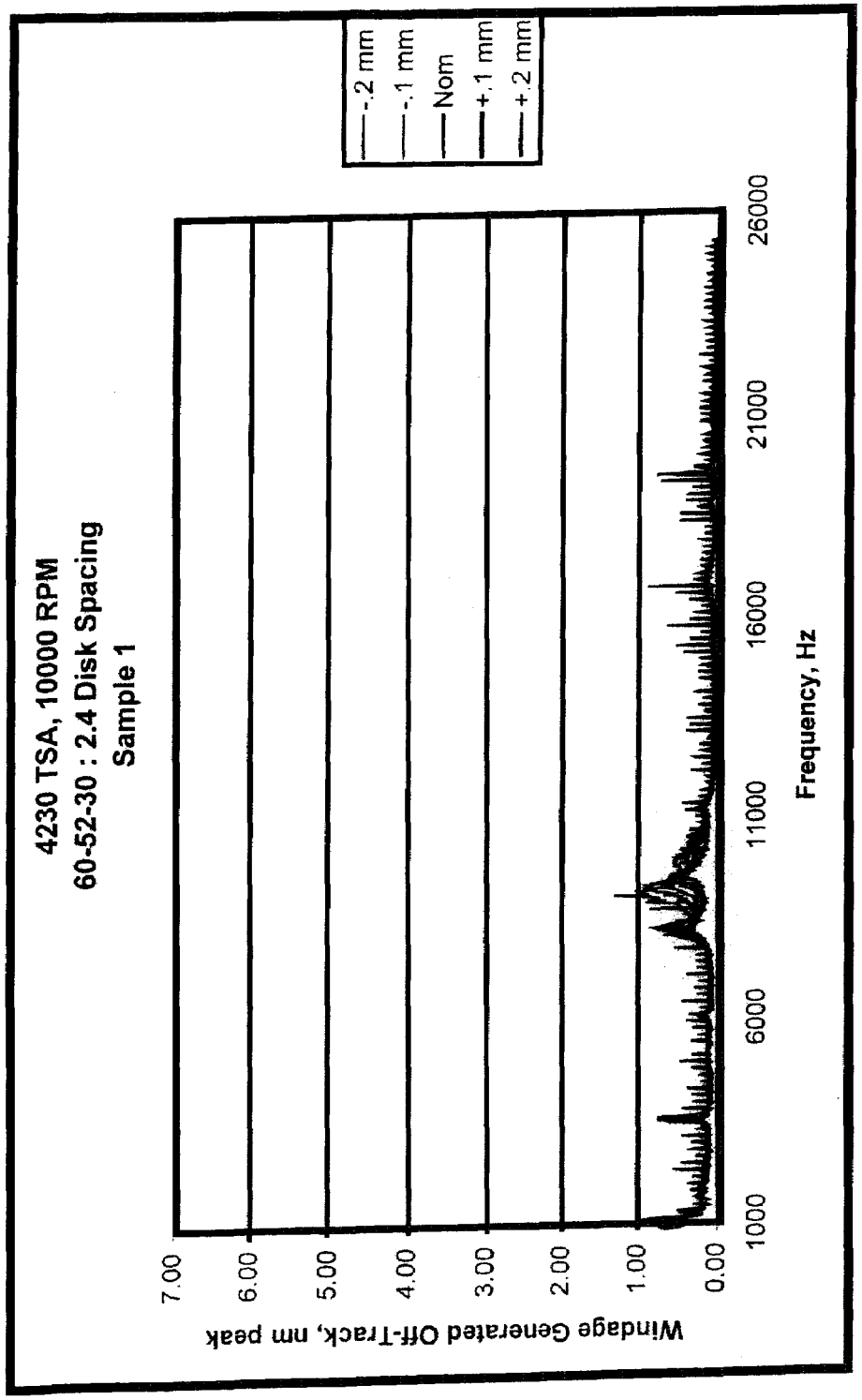
FIGS. 15c–15d are graphical data showing windage off-track for a second head suspension in a conventional disk drive.
Figure 15D:
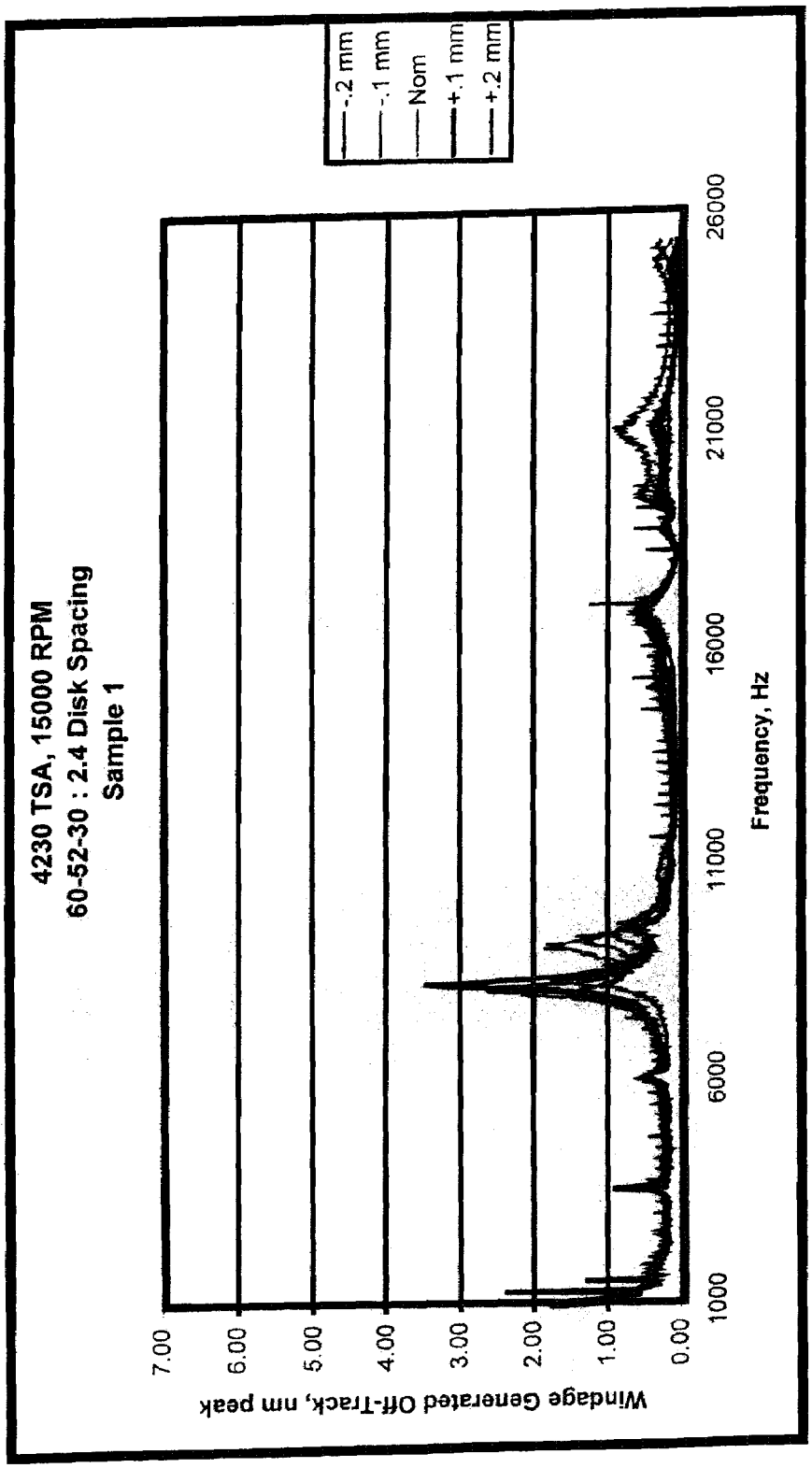
Figure 16C:
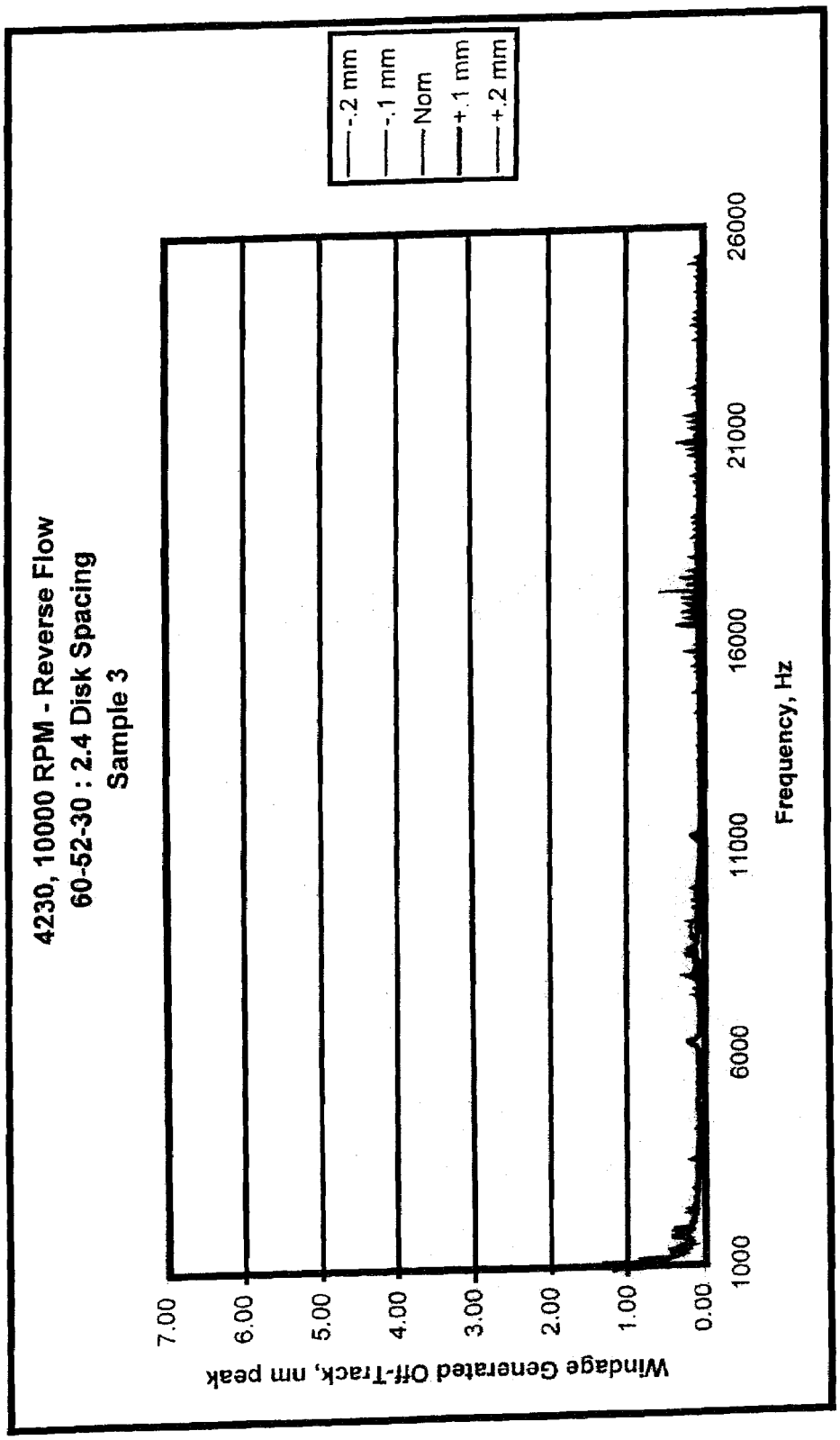
FIGS. 16c–16d are graphical data showing windage off-track in a reverse flow disk drive using the head suspension evaluated in FIGS. 15c–15d.
Figure 16D:
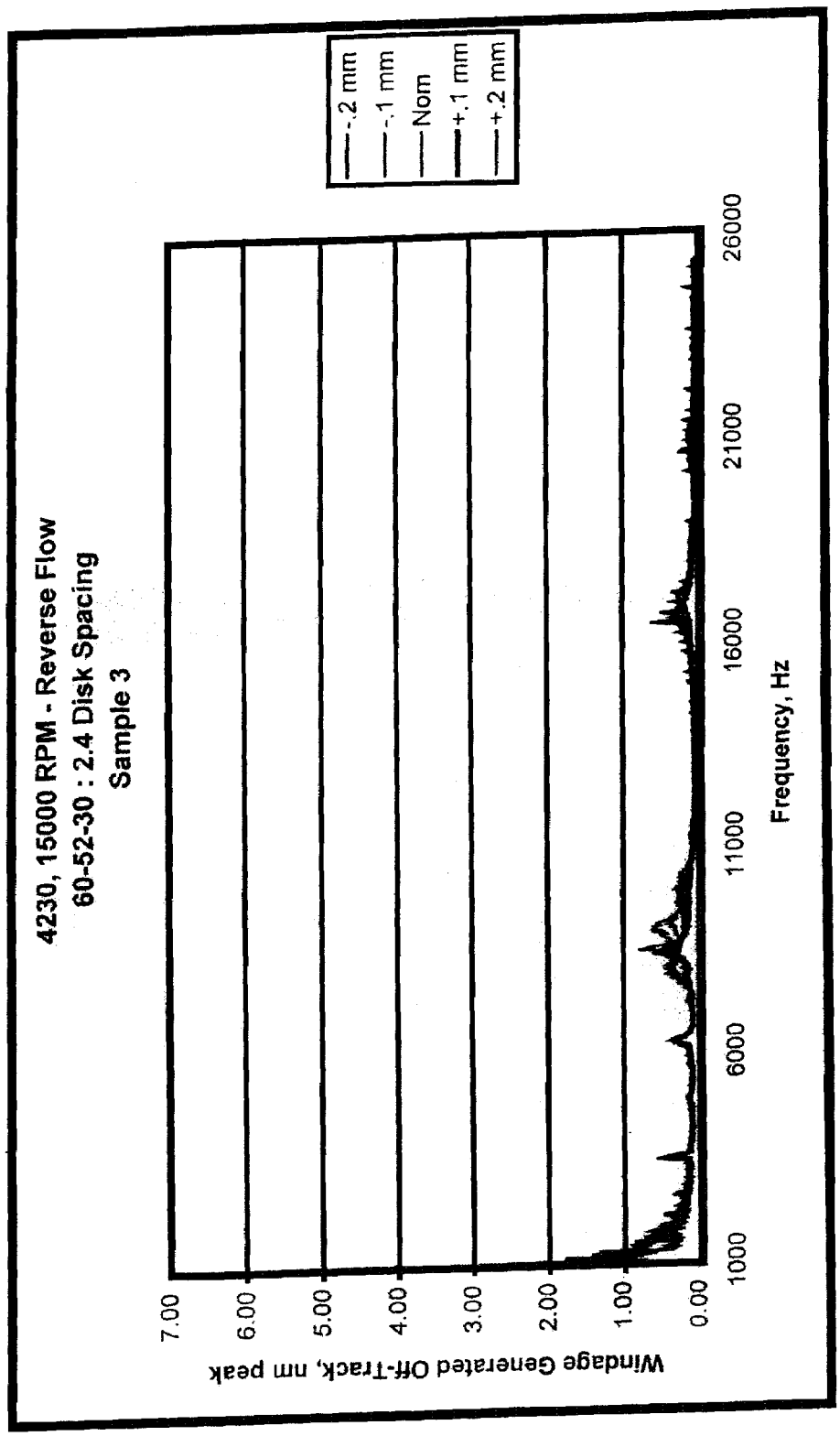

Similarly, as illustrated in FIG. 16C, at about 10,000 revolutions per minute the 4230 TSA head suspension experienced about a 55% reduction in windage induced vibration than the vibration experienced in a conventional disk drive as illustrated in FIG. 15C. As illustrated in FIG. 16D, at about 15,000 revolutions per minute the 4230 TSA head suspension experienced about a 61% reduction in windage induced vibration than the vibration experienced in a conventional disk drive as illustrated in FIG. 15D.

The micro-actuated Mag 5e head suspension experienced a greater reduction in windage induced vibration than the non-actuated 4230 TSA head suspension. The difference in reduction is believed to be due to undesirable aerodynamic features on the Mag 5e micro-actuated head suspension.

EXAMPLE 2

Figure 17A:
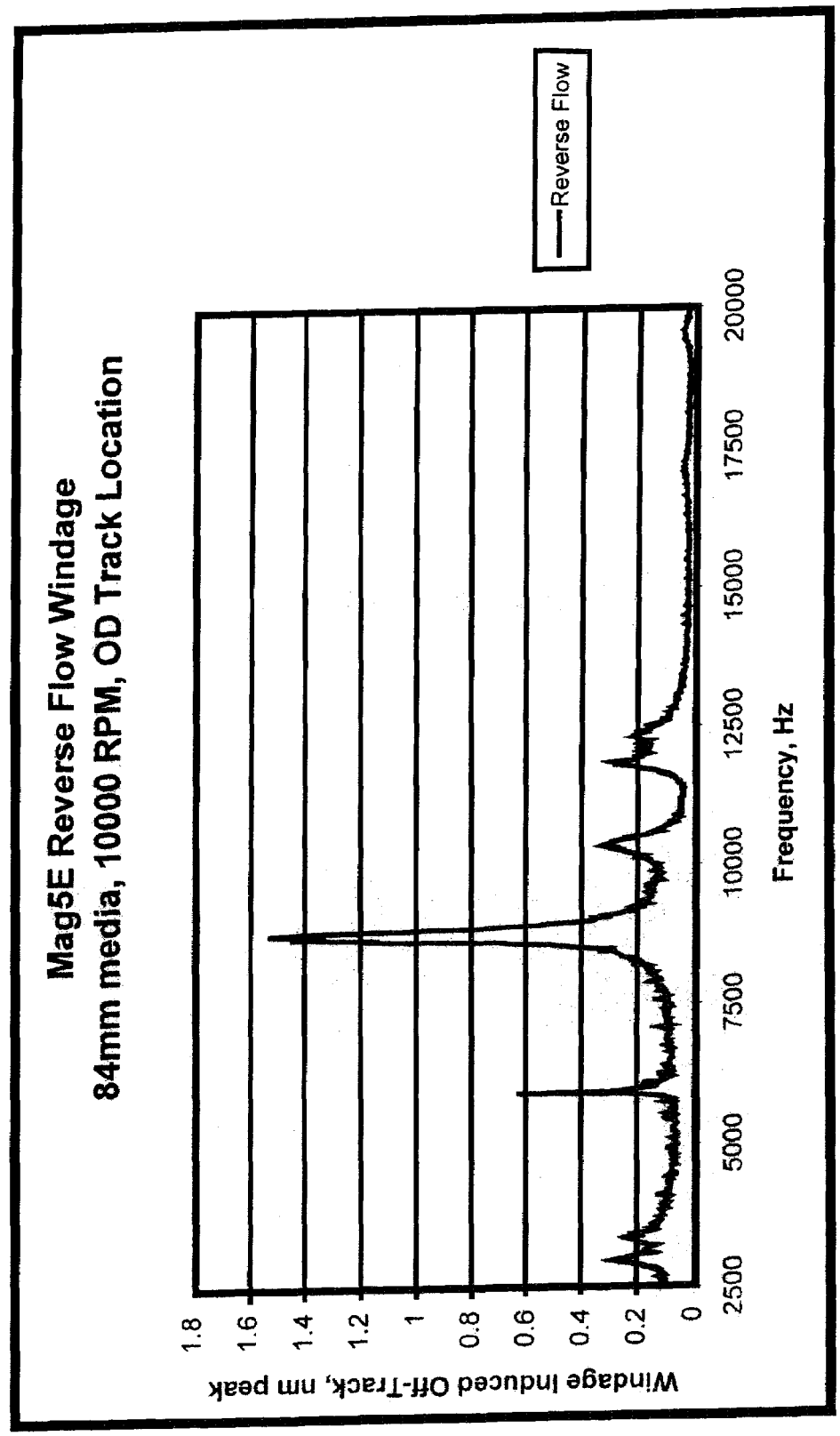
FIG. 17a is graphical data showing windage off-track in a reverse flow disk drive without a downstream attenuator.
Figure 17B:
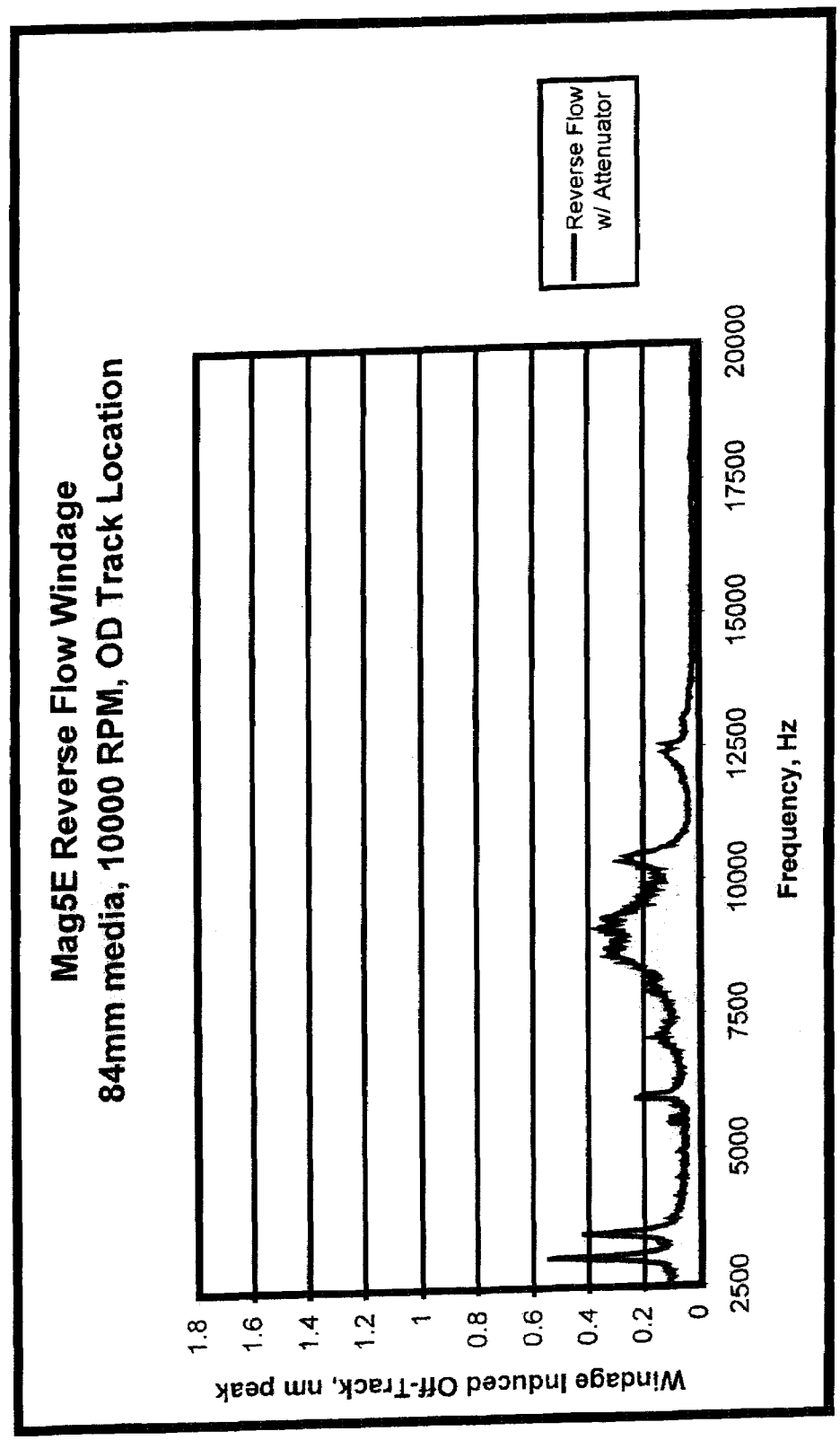
FIG. 17b is graphical data showing windage off-track in the reverse flow disk drive evaluated in FIG. 17a with a downstream attenuator.

FIG. 17A illustrates off-track movement generated by airflow induced vibration in a reverse flow disk drive without an airflow attenuator. FIG. 17B illustrates off-track movement generated by airflow induced vibration in a reverse flow disk drive with an airflow attenuator. The head suspension assembly was a Mag 5e available from Hutchinson Technology located in Hutchinson, Minn. The disk drive was operated at about 10,000 revolutions per minute. The airflow attenuator was generally as indicated in FIG. 12 and had an effective surface area of 10 millimeters$^2$. The graph indicates the windage generated off track in nanometers.

As illustrated in FIG. 17B, at about 15,000 revolutions per minute the head suspension with the airflow attenuator experienced about a 33% reduction in windage induced vibration than the vibration experienced by the head suspension without the airflow attenuator.

All of the patents and patent applications disclosed herein, including those set forth in the Background of the Invention, are hereby incorporated by reference. With regard to the foregoing description, it is to be understood that changes may be made in detail, without departing from the scope of the present invention. For example, the present reverse airflow disk drive can be used with any combination of airflow attenuators, micro-actuators on the head suspension, and or backward flexures. It is intended that the specification and depicted aspects be considered exemplary only, with a true scope and spirit of the invention being indicated by the broad meaning of the following claims.

What is claimed is:

1. A head suspension for a reverse flow disk drive having one or more disks that rotate in a first direction, the head suspension comprising:
    a load beam having a mounting region at a proximal end, a rigid region at a distal end, and a spring region between the mounting region and the rigid region, the disks including disk features that pass the distal end before passing the proximal end when the disks rotate in the first direction;
    a flexure mounted on the distal end of the rigid region;
    a slider mounted on the flexure, the slider having a proximal end closest to the proximal end of the load beam, wherein the spring region, the rigid region, the flexure and the slider comprise an active portion;
    one or more read/write heads located on the proximal end of the slider;
    a plurality of electrical traces extending along the load beam to the proximal end of the slider; and
    at least one airflow attenuator located on the load beam downstream from the active portion and shaped to create a region of reduced airflow velocity proximate at least a portion of the active portion.

2. The head suspension of claim 1 wherein:
    the flexure includes a cantilevered slider mounting region having a free end extending toward the proximal end of the load beam; and
    a portion of the electrical conductors extends along the slider mounting region from the distal end of the load beam toward the free end of the slider mounting region.

3. The head suspension of claim 2 comprises contact pads electrically coupled with the electrical traces and positioned adjacent to the free end of the slider mounting region for electrically coupling with the read/write head.

4. The head suspension of claim 1 wherein a portion of the electrical traces are integral with the slider and extend from a distal end of the slider to the proximal end of the slider.

5. The head suspension of claim 1 wherein:
    the flexure includes a pair of lateral arms and a cantilevered slider mounting surface having a free end extending toward the proximal end of the load beam, and a gap between the free end and the lateral arms of the flexure; and
    the electrical conductors span the gap.

6. The head suspension of claim 5 comprises contact pads electrically coupled with the electrical traces and positioned adjacent to the free end of the slider mounting region for electrically coupling with the read/write head.

7. The head suspension of claim 1 wherein:
    the rigid region and the flexure include a via proximate a rear surface of the slider; and
    the electrical traces extending through the via and electrically coupled to the slider.

8. The head suspension of claim 1 wherein the flexure comprises an inverted gimbal including a gimbal distal end adjacent to the distal end of the load beam and a gimbal proximal end, the inverted gimbal comprising:
    a slider mounting region including a proximal end closest to the proximal end of the load beam;
    a pair of outer arms extending from the gimbal proximal end to a distal cross piece proximate the gimbal distal end;
    a pair of inner arms extending from the distal cross piece to a proximal cross piece proximate the gimbal proximal end; and
    a cantilever beam connecting the proximal cross piece to the proximal end of the slider mounting region.

9. The head suspension of claim 8 wherein the electrical traces routed along the outer arms from the gimbal proximal end to the distal cross piece and along the inner arm from the distal cross piece to the proximal cross piece.

10. The head suspension of claim 9 comprises contact pads electrically coupled with the electrical traces and positioned adjacent to the proximal end of the slider mounting region for electrically coupling with the read/write head.

11. The head suspension of claim 1 wherein the airflow attenuator extends along one or more of a side, a top, and a bottom of the head suspension.

12. The head suspension of claim 1 wherein the airflow attenuators is integrally formed from a material of the load beam.

13. The head suspension of claim 12 wherein the airflow attenuator is integrally formed from a material of the mounting region.

14. The head suspension of claim 12 wherein the airflow attenuator is integrally formed from the material of the load beam by a bend.

15. The head suspension of claim 14 wherein the airflow attenuator is integrally formed from the material of the load beam by a single bend of about 90 degrees.

16. The head suspension of claim 1 wherein the airflow attenuator is attached to the load beam and wherein the airflow attenuator and the load beam comprise separate components.

17. The head suspension of claim 1 wherein the airflow attenuator is swept forward toward a gimbal region of the head suspension.

18. The head suspension of claim 1 wherein the airflow attenuator includes an effective surface facing a gimbal region of the head suspension.

19. The head suspension of claim 18 wherein the effective surface is generally perpendicular to the longitudinal axis of the load beam.

20. The head suspension of claim 18 wherein the effective surface is generally perpendicular to a top surface of the load beam.

21. The head suspension of claim 1 wherein the airflow attenuator is located on an inactive portion of an unamount arm.

22. The head suspension of claim 1 comprising one or more micro-actuators.

23. A reverse flow disk drive, comprising:

one or more disks rotate in a first direction;

one or more head suspensions comprising:

a load beam having a mounting region at a proximal end, a rigid region at a distal end, and a spring region between the mounting region and the rigid region, the disks including disk features that pass the distal end before passing the proximal end when the disks rotate in the first direction;

a flexure mounted on the distal end of the rigid region;

a slider mounted on the flexure, the slider having a proximal end closest to the proximal end of the load beam, wherein the spring region, the rigid region, the flexure and the slider comprise an active portion;

one or more read/write heads located on the proximal end of the slider;

a plurality of electrical traces extending along the load beam to the proximal end of the slider; and at least one airflow attenuator located on the load beam downstream from the active portion and shaped to create a region of reduced airflow velocity proximate at least a portion of the active portion.

* * * * *